US012482564B2

(12) United States Patent
Addanki

(10) Patent No.: US 12,482,564 B2
(45) Date of Patent: Nov. 25, 2025

(54) DATA PROCESSING SYSTEM FOR ESTIMATING DISEASE PROGRESSION RATES

(71) Applicant: Anvitha Addanki, Canton, MA (US)

(72) Inventor: Anvitha Addanki, Canton, MA (US)

( * ) Notice: Subject to any disclaimer, the term of this patent is extended or adjusted under 35 U.S.C. 154(b) by 472 days.

(21) Appl. No.: 17/168,733

(22) Filed: Feb. 5, 2021

(65) Prior Publication Data

US 2022/0254490 A1 Aug. 11, 2022

(51) Int. Cl.
*G16H 50/20* (2018.01)
*G06T 7/00* (2017.01)
*G16B 40/00* (2019.01)
*G16H 30/40* (2018.01)
*G16H 50/30* (2018.01)
*A61B 10/00* (2006.01)

(52) U.S. Cl.
CPC .......... *G16H 50/20* (2018.01); *G06T 7/0016* (2013.01); *G16B 40/00* (2019.02); *G16H 30/40* (2018.01); *G16H 50/30* (2018.01); *A61B 10/0041* (2013.01); *G06T 2207/20081* (2013.01); *G06T 2207/20084* (2013.01); *G06T 2207/30016* (2013.01); *G06T 2207/30024* (2013.01); *G06T 2207/30096* (2013.01)

(58) Field of Classification Search
CPC ........ G16H 50/20; G16B 40/00; A61B 5/165; A61B 3/102; A61B 5/1075
USPC .......................................................... 600/425
See application file for complete search history.

(56) References Cited

U.S. PATENT DOCUMENTS

| | | | |
|---|---|---|---|
| 10,676,746 B2 | 6/2020 | Kemp et al. | |
| 10,692,607 B2 | 6/2020 | Viswanath et al. | |
| 10,696,973 B2 | 6/2020 | Chen et al. | |
| 10,697,005 B2 | 6/2020 | Vallabhaneni | |
| 10,697,023 B2 | 6/2020 | Scott et al. | |
| 10,699,434 B2 | 6/2020 | Grimm et al. | |
| 2019/0049435 A1* | 2/2019 | Lyden | G16H 50/20 |
| 2020/0342599 A1* | 10/2020 | Nakamura | G06T 7/0012 |

(Continued)

OTHER PUBLICATIONS abta.org, "Glioblastoma (GBM)," retrieved Apr. 20, 2021 from URL <https://www.abta.org/tumor_types/glioblastoma-gbm/>.

(Continued)

*Primary Examiner* — Reginald R Reyes
(74) *Attorney, Agent, or Firm* — Fish & Richardson P.C.

(57) ABSTRACT

A method for treatment of a disease by monitoring a progression of the disease includes obtaining image data including a representation of diseased cells of a patient. Based on the type of the disease, one or more features to extract from the image data are determined, the features each representing a physical parameter of at least one of the diseased cells represented in the image data. A feature vector is formed from the extracted features. A machine learning model is selected, and the feature vector is processed using the machine learning model. The machine learning model is trained with labeled image data representing instances of diseased cells having the disease and associating scores representing predicted rates of disease progression with the respective instances of diseased cells having the type of disease. Based on the processing, a score is determined that represents a predicted rate of disease progression indicated by the image data.

21 Claims, 13 Drawing Sheets

(56) References Cited

U.S. PATENT DOCUMENTS

2021/0090694 A1* 3/2021 Colley .................. G16B 30/00

OTHER PUBLICATIONS

Benzekry et al., "Classical mathematical models for description and prediction of experimental tumor growth," PLoS Computational Biology., Aug. 28, 2014, 10(8):e1003800, 20 pages.

Bhattarai et al., "Machine-based learning-based prediction of breast cancer growth rate in vivo," British Journal of Cancer, Sep. 2019, 121(6):497-504.

Bortolotto et al., "NF-κB mediated regulation of adult hippocampal neurogenesis: relevance to mood disorders and antidepressant activity," BioMed Research International, Feb. 2014, vol. 2014, 12 pages.

Cheong et al., "Understanding NF-κB signaling via mathematical modeling," Molecular Systems Biology, May 2008, 4(1):192.

Conroy et al., "IL-8 associates with a pro-angiogenic and mesenchymal subtype in glioblastoma," Oncotarget, Mar. 20, 2018, 9(21):15721.

Cook et al., "Toll-like receptors in the pathogenesis of human disease," Nature Immunology, Oct. 2004, 5(10):975-9.

Gilmore, "NF-κB Transcription Factors," Boston University Biology, retrieved Apr. 20, 2021 from URL <http://www.bu.edu/nf-kb/>, 6 pages.

Mehrara et al., "Analysis of inter-patient variations in tumour growth rate," Theoretical Biology and Medical Modelling, Dec. 2014, 11(1):1-1.

Soubannier et al., "NF-κB signalling in glioblastoma," Biomedicines, Jun. 2017, 5(2):29, 15 pages.

Talkington et al., "Estimating tumor growth rates in vivo," Bulletin of Mathematical Biology, Oct. 2015, 77(10):1934-54.

* cited by examiner

DATA PROCESSING SYSTEM FOR ESTIMATING DISEASE PROGRESSION RATES

FIELD OF THE INVENTION

This disclosure generally relates to data processing. More specifically, this disclosure relates to machine learning models for estimating tumor growth rates.

BACKGROUND

Glioblastoma multiforme (GBM) are malignant Grade IV tumors that include over 15% of all brain tumor cases. Generally, GBM are associated with high cellular heterogeneity, resistance to treatment, and common recurrence following treatment. GBM, if left untreated in a patient, can cause symptoms which generally include sensory loss, difficulty with balance, edema, intense pressure and swelling of the brain, and neurocognitive deficits. Early detection and treatment (as soon as possible) are ideal for managing GBM and reducing severity or eliminating entirely these symptoms in a patient.

GBM can be difficult to treat due to the variability in the cellular response to certain therapeutic approaches and the relatively rapid nature of GBM tumor growth and the finger-like elongations of the tumor itself. Actual GBM tumor growth rates vary and can be based on the immune characteristics of different patients. The rate of GBM tumor growth is often attributed to genetic differences. Because of this, it can be difficult to determine how rapidly tumor growth will occur in a patient at a given stage of development of GBM tumors. As a result, it can be difficult to determine how profusely to use one or more therapeutic strategies, which may also have adverse side effects, to treat GBM tumors.

Therapeutic strategies for treating GBM generally include one or more of the following. Radiation and chemotherapy are used in combination to slow down tumor growth. Tumor Treating Fields (TT Fields) may also be used with chemotherapy. TT Fields include mild electrical fields that pulse through the skin of the scalp and interrupt cancer cells' ability to divide.

SUMMARY

This disclosure describes a noninvasive method and data processing system to estimate disease progression, such as a tumor growth rate for GBM, based on an analysis of tumor microenvironments including cell tissue. Generally, the data processing system is configured to execute a machine learning model to analyze data representing the tumors in silico. The results of this analysis are corroborated with analysis of a signaling pathway (e.g., NF-κB) activation in vitro.

NF-κB is a signaling pathway that is present in many biological processes and which can be monitored to determine a status of GBM tumor growth. More specifically, proteins in the family of NF-κB transcription factors are related through a highly conserved Rel Homology Domain (RHD), which is necessary for DNA binding, dimerization, and nuclear localization. The RHD is found in a family of eukaryotic transcription factors, which includes NF-kappaB, Dorsal, Relish, Nuclear factor of activated T-cells (NFAT), among others. The RHD is composed of two structural domains: an N-terminal DNA binding domain, and a C-terminal domain has an immunoglobulin-like fold that functions as a dimerization domain.

The data processing system is configured to predict tumor growth on a variety of factors. For example, based on functional magnetic resonance imaging (fMRI) scans, deceased individuals with GBM are shown to have a lesser volume of subdivisions of the frontal lobe, both in absolute and percentage terms, when compared to living individuals with GBM. Additionally, GBM cells with higher NF-κB activation generally may have higher rates of growth.

The data processing system is configured to obtain image data (e.g., an fMRI scan) of the GBM cells (e.g., brain tissue). The diseased cells are tagged, such as with a florescent protein or antigen tag. A fluoroscope is used to monitor these cells at periodic intervals or continuously. A set of parameters that describe the cells are used as features for the machine learning model. The parameters each represent a physical aspect of the cells. For example, the parameters can include cell shape, such as a smoothness profile of a perimeter of the cells. The parameters can include cell size, nuclei shape and/or size, cell density, cell migration, and other similar physical aspects.

The data processing system processes images of the cells to extract values for the identified parameters. The parameter values (or functions of the parameter values) can form feature vectors that are configured as inputs for the machine learning model. The exact configuration of the feature vector can depend on the particular type of machine learning model that is processing the feature vector. For example, the machine learning model can include a neural network (NN), such as a convolutional neural network (CNN), Deep Residual Network (DRN), support vector machine (SVN), recurrent neural network (RNN), long/short term memory network (LSTM), Boltzmann Machine (BM), and so forth. Generally, the type of machine learning model used is a model optimized for classification, image recognition, and/or time series forecasting. The machine learning model can be trained with image data that is already associated with GBM diagnosis.

The data processing system executes the machine learning model to associate images including the tagged cells with scores representing a rate of disease progression. The scores and the associated images can be stored in a data store for downstream applications. The downstream applications can include additional processing of the images, presentation of the scores and images to users, generation of a treatment regimen, and so forth.

The platform can enable one or more technical advantages. By analyzing tumor microenvironments, the data processing system is configured to noninvasively determine a rate of GBM tumor growth for a patient. The determination of the rate of tumor grown enables relatively early diagnosis and more efficient treatment of GBM, when the approach is compared to existing approaches that require invasive investigation of the microenvironment of the GBM tumor cells. Early diagnosis and treatment improves overall health and quality of life of affected individuals.

Based on the disease data available, the data processing system can be configured to apply a combination of algorithms (ensemble) that are suitable for estimating a particular disease. In this way, the data processing system is flexible to process particular data for a particular disease or diseases. For a given disease dataset, feature engineering is generally performed to arrive at statistically important subset of cell parameters (e.g., parameters which have the most information gain when compared to others). Feature engineering that is enabled by the data processing system can reduce noise, bias and data skew in the data input being provided to the ML model, and improve the output quality.

The one or more advantages are enabled by one or more of the following aspects or embodiments.

In a general aspect, a process for treatment of a disease by monitoring a progression of the disease includes obtaining image data including a representation of diseased cells of a patient, the diseased cells having a type of disease. The process includes, based on the type of the disease, determining one or more features to extract from the image data, the features each representing a physical parameter of at least one of the diseased cells represented in the image data. The process includes extracting the one or more features from the image data to form a feature vector. The process includes, based on the type of the disease, selecting a machine learning model. The process includes processing the feature vector using the machine learning model, the machine learning model being trained with labeled image data representing instances of diseased cells having the type of disease, the labeled image data associating scores representing predicted rates of disease progression with the respective instances of diseased cells having the type of diseases. The process includes determining, based on the processing, a score representing a predicted rate of disease progression indicated by the image data. The process includes storing, in a data store, the score in association with the image data.

In some implementations, cells of the image data are tagged with a protein tag, and wherein extracting the one or more features from the image data comprises identifying cells having the protein tag in the image data.

In some implementations, the protein tag is configured to fluorescently label cells in an nfKb signal pathway, and wherein the type of disease comprises a glioblastoma multiforme (GBM) tumor. In some implementations, the process includes including, in the feature vector based on the nfKb signal pathway that is labeled, a feature value representing the nfKb signal pathway. In some implementations, the process includes processing, using the machine learning model, the feature value. In some implementations, the process includes determining, based on the processing, the score representing the predicted rate of disease progression, wherein the disease progression represents a growth rate of the GBM tumor.

In some implementations, the image data include a series of images including the diseased cells of the patient and captured at time intervals. Each image of the series of images is associated with a respective score to form a sequence of scores for the patient for each of the time intervals.

In some implementations, a length of one or more of the time intervals is automatically adjusted based on a determined growth rate of the diseased cells. In some implementations, the type of disease includes at least one of a cancer, a bacteria, or a virus.

In some implementations, the diseased cells are constituents of brain tissue, and wherein the extracted features of the feature vector include one or more of a cortical mean thickness value of the brain tissue, an inner-cortical surface area of the brain tissue, a mid-cortical surface area of the brain tissue, a pial-cortical surface area of the brain tissue, grey matter (GM) volume of the brain tissue, cerebrospinal fluid (CSF) volume of the brain tissue, white matter (WM) volume of the brain tissue, and a total volume for GM, CSF, and WM for each region of interest in the brain tissue.

In some implementations, the extracted features of the feature vector include one or more of a size of a diseased cell or group of diseased cells, a shape of a diseased cell or group of diseased cells, a size of a nucleus of a diseased cell, a shape of a nucleus of a diseased cell, a cell density of the diseased cells in tissue represented in the image data, and a pattern of cell migration of one or more of the diseased cells relative to neighboring cells.

In some implementations, the machine learning model comprises a convolutional neural network (CNN), wherein one or more synapse weights are set based on the labeled image data. In some implementations, the predicted rate of disease progression represents a rate of proliferation of diseased cells.

In a general aspect, a system for treatment of a disease by monitoring a progression of the disease includes at least one processing device; and a memory in communication with the at least one processing device, the memory storing instructions that, when executed by the at least one processing device, cause the at least one processing device to perform operations. In some implementations, the operations include obtaining image data including a representation of diseased cells of a patient, the diseased cells having a type of disease. In some implementations, the operations include, based on the type of the disease, determining one or more features to extract from the image data, the features each representing a physical parameter of at least one of the diseased cells represented in the image data. In some implementations, the operations include extracting the one or more features from the image data to form a feature vector. In some implementations, the operations include, based on the type of the disease, selecting a machine learning model. In some implementations, the operations include processing the feature vector using the machine learning model, the machine learning model being trained with labeled image data representing instances of diseased cells having the type of disease, the labeled image data associating scores representing predicted rates of disease progression with the respective instances of diseased cells having the type of disease. In some implementations, the operations include determining, based on the processing, a score representing a predicted rate of disease progression indicated by the image data. In some implementations, the operations include storing, in a data store, the score in association with the image data.

In some implementations, cells of the image data are tagged with a protein tag, and wherein extracting the one or more features from the image data comprises identifying cells having the protein tag in the image data.

In some implementations, the protein tag is configured to fluorescently label cells in an nfKb signal pathway, and wherein the type of disease comprises a glioblastoma multiforme (GBM) tumor. In some implementations, the operations include including, in the feature vector based on the nfKb signal pathway that is labeled, a feature value representing the nfKb signal pathway. In some implementations, the operations include processing, using the machine learning model, the feature value. In some implementations, the operations include determining, based on the processing, the score representing the predicted rate of disease progression, wherein the disease progression represents a growth rate of the GBM tumor.

In some implementations, the image data include a series of images including the diseased cells of the patient and captured at time intervals, and wherein each image of the series of images is associated with a respective score to form a sequence of scores for the patient for each of the time intervals.

In some implementations, a length of one or more of the time intervals is automatically adjusted based on a determined growth rate of the diseased cells.

In some implementations, the type of disease includes at least one of a cancer, a bacteria, or a virus.

In some implementations, the diseased cells are constituents of brain tissue, and wherein the extracted features of the feature vector include one or more of a cortical mean thickness value of the brain tissue, an inner-cortical surface area of the brain tissue, a mid-cortical surface area of the brain tissue, a pial-cortical surface area of the brain tissue, grey matter (GM) volume of the brain tissue, cerebrospinal fluid (CSF) volume of the brain tissue, white matter (WM) volume of the brain tissue, and a total volume for GM, CSF, and WM for each region of interest in the brain tissue.

In some implementations, the extracted features of the feature vector include one or more of a size of a diseased cell or group of diseased cells, a shape of a diseased cell or group of diseased cells, a size of a nucleus of a diseased cell, a shape of a nucleus of a diseased cell, a cell density of the diseased cells in tissue represented in the image data, and a pattern of cell migration of one or more of the diseased cells relative to neighboring cells.

In some implementations, the machine learning model comprises a convolutional neural network (CNN), wherein one or more synapse weights are set based on the labeled image data.

In some implementations, one or more non-transitory computer readable media storing executable instructions that, when executed by at least one processing device, cause the at least one processing device to perform operations for treatment of a disease by monitoring a progression of the disease. In some implementations, the operations include obtaining image data including a representation of diseased cells of a patient, the diseased cells having a type of disease. In some implementations, the operations include, based on the type of the disease, determining one or more features to extract from the image data, the features each representing a physical parameter of at least one of the diseased cells represented in the image data. In some implementations, the operations include extracting the one or more features from the image data to form a feature vector. In some implementations, the operations include, based on the type of the disease, selecting a machine learning model. In some implementations, the operations include processing the feature vector using the machine learning model, the machine learning model being trained with labeled image data representing instances of diseased cells having the type of disease, the labeled image data associating scores representing predicted rates of disease progression with the respective instances of diseased cells having the type of disease. In some implementations, the operations include determining, based on the processing, a score representing a predicted rate of disease progression indicated by the image data. In some implementations, the operations include storing, in a data store, the score in association with the image data.

The details of one or more embodiments of these systems and methods are set forth in the accompanying drawings and the description to be presented. Other features, objects, and advantages of these systems and methods will be apparent from the description and drawings, and from the claims.

DETAILED DESCRIPTION

Figure 1:
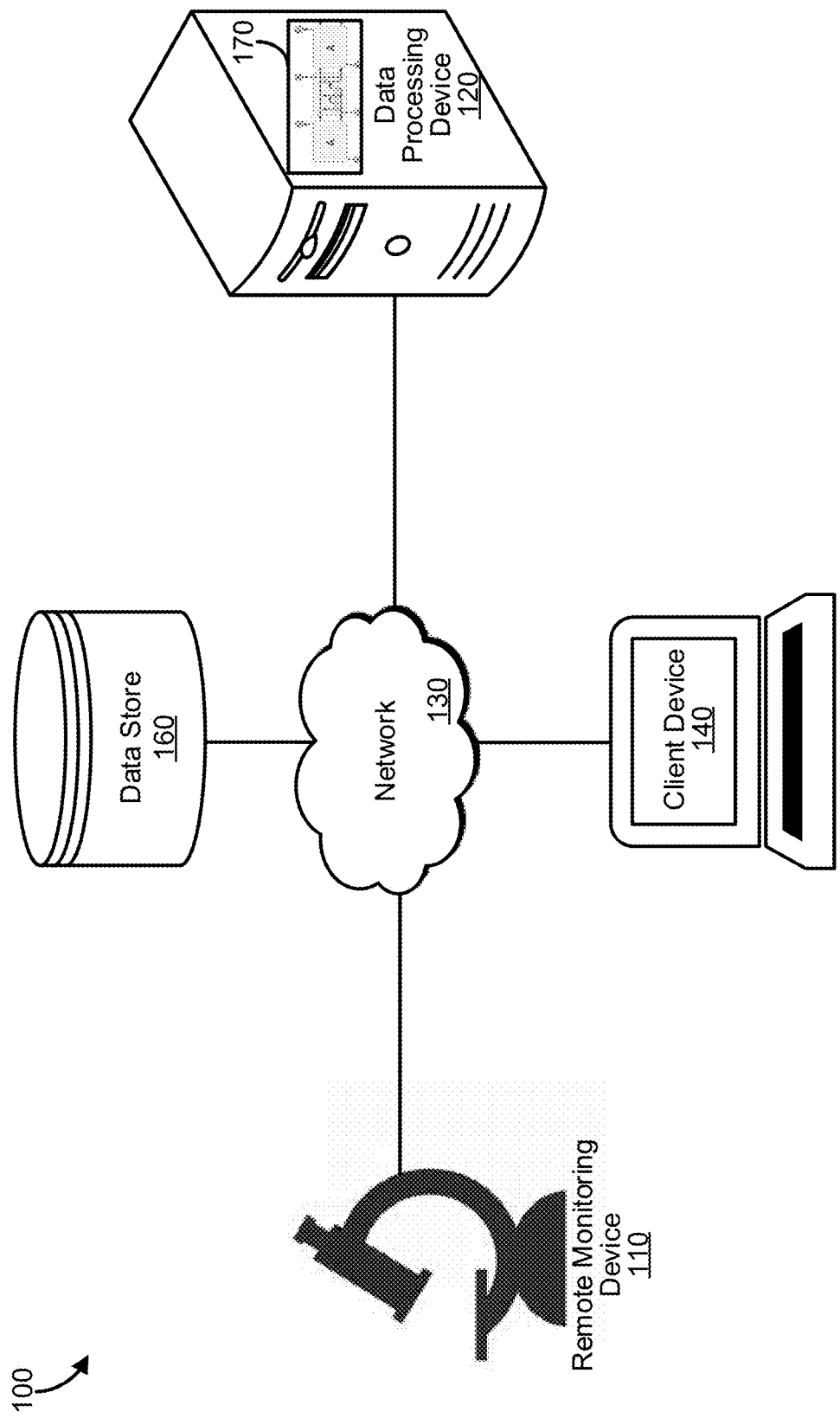
FIG. 1 shows an example system for estimating disease progression from image data using machine learning models.

FIG. 1 shows an example data processing system 100 for estimating disease progression of a disease. More specifically, the data processing system 100 determines or predicts a rate of disease progression in humans based on a molecular and/or a cellular microenvironment of a disease-causing tumor, virus, bacteria, or any other similar agent. The data processing system 100 generates the determined or predicted rate of progression based on machine learning models (e.g., machine learning model 170), subsequently described in detail. The data processing system 100 is configured to enable medical service providers to tailor therapeutic strategies to individual patients depending on their respective disease characteristics and rate of progression.

The data processing system 100 includes a remote monitoring device 110, a data processing device 120, a client device 140, and a data store 160. The monitoring device 110, the data processing device 120, and the data store 160 can communicate over a network 130 (e.g., a wired or wireless communications network). Each of these devices is subsequently described in further detail. In some implementations, one or more of the remote monitoring device 110, data processing device 120, client device 140, and the data store 160 are combined into a single device or system configured to perform the functions of each constituent device.

The data processing system 100 is configured to obtain image data, such as functional magnetic resonance imaging (fMRI) images, including representations of diseased tissue. In an example, diseased tissue includes tissue in which cancerous cells, virus infected cells, or bacteria are present. For example, cancerous cells can form tumor growths. The data processing system 100 processes the fMRI image data to determine whether the tumor growths are present in the tissue, to determine a growth stage of tumors present in the tissue, and to predict a rate of growth for the tumors present in the tissue. The tumors can include Glioblastoma multiforme (GBM). GBM are malignant Grade IV tumors associated with relatively high cellular heterogeneity, high resistance to treatment, and common recurrence following treatment, when compared to other tumor types. Generally, the diseased tissue include brain tissue and can further be frontal lobe tissue, (or anywhere in which GBM occurs). In an aspect, a similar approach is used to detect the presence of virus infected cells or bacteria being present in the image. The bacteria proliferation or virus proliferation are tracked in a similar manner as the tumor growth.

The data processing system 100 includes a data processing device 120. The data processing device 120 is generally a computing system configured to host at least one machine learning model 170. The data processing device 120 is configured to perform the processing operations for determining the rate of disease progression, including image processing functions, scoring functions, and machine learning model calculations which are subsequently described. In an example, the data processing device 120 can be combined with the data store 160 for storing libraries of image data including training data for the machine learning model 170 and patient image data to be processed. In an example, the data processing device 120 is combined with the client device 140, subsequently described, to provide a user interface enabling a user to interact with the data processing device 120 directly. Examples of the data processing device 120 and hosted machine learning models 170 are further described in relation to FIG. 9.

The data processing system 100 can include at least one remote-monitoring device 110. The remote monitoring device 110 can be automated to obtain image data representing diseased tissue. The remote monitoring device 110 provides additional data (e.g., image data) about the diseased tissue of the patient to the data processing device 120. The additional image data can represent diseased tissue at a later point in time relative to initial image data analyzed by the data processing device 120. The additional image data can enable the data processing device 120 to update the prediction of the rate of disease progression for the patient over time.

The remote monitoring device 110 can include a microscope, such as a fluoroscope or a scanning electron microscope. The remote monitoring device 110 intermittently or continuously provides image data for updating predictions of disease progression, such as tumor growth rate. The frequency at which the remote monitoring device 110 monitors the cell sample can be modified based on the rate of growth. For example, a sample in which cells proliferate faster can be imaged at a higher frequency to ensure comprehensive imaging. Generally, the image data gathered by the remote monitoring device 110 is configured as an input for the machine learning model 170 of the data processing system 100. The machine learning model 170 of the data processing device 120 processes the additional data and updates the prediction score for the patient. In some implementations, the data processing device 120 associates each image with an intermediate score, which can be a score indicative of a progression of the disease for that image. The data processing device 120 can aggregate the scores of the image data for a patient to generate a final prediction. The aggregation can be based on one or more functions of the score(s) for the patient. The particular function can vary based on the type of disease being tracked. The function can include a moving average, a curve fit, or other data extrapolation based on data heuristics.

The data processing system 100 is configured to determine rates for progression of GBM tumor growth, any tumor growth for any cancer, virus proliferation, or bacteria proliferation. The data processing system 100 uses the machine learning model 170 (subsequently described in greater detail) to generate predictions data for the rate of disease progression (e.g., of GBM tumor growth) for a given patient. Generating predictions of a progression rate can be difficult due to several factors. For example, the rate at which a given disease progresses varies for different individuals based on cellular microenvironments and immune characteristics of the patient. To optimize treatment of the patient, treatment protocols can be recommended by the data processing system 100 based on data representing a unique molecular profile and a unique cellular profile of that particular patient.

In some implementations, the data processing system 100 analyzes the factors that can contribute to disease growth using images of cells taken on custom microscopes in real time to determine the rate of disease progression. For example, a link between nuclear factor κB (NF-κB), a signaling pathway in the brain, and GBM tumor growth rate can be further described using the machine learning model 170. In this example, the image data (e.g., from fMRI) are configured to represent a particular of region of the brain. The image data represent which regions of the brain are affected by GBM tumors.

The machine learning model 170 and scoring module of the data processing device 120 are configured to incorporate relationships between the image data disease progression. For GBM, the machine learning model 170 relates characteristics of a region of the brain being imaged to GBM tumor growth rate. The relationship that is determined by the machine learning model 170 is used for scoring disease progression. In an example, the machine learning model 170 can detect that the image data represent a particular feature in a brain of the patient. The data processing device 120 receives output data from the machine learning model 170 indicating the presence of the feature in the image data. The data processing device 120 uses the output data as a part of a scoring determination. For example, the machine learning model 170 may specify a relationship between a thickness of a frontal lobe of the brain and the disease progression rate for GBM, which is based on historical disease data and demographic factors including race, gender, and age. In another example, an indication of activation of an nF-κB pathway is related to different rates of cell progression in GBM. In this example, a protein tag is introduced to the brain tissue. The protein tag can include a fluorescent tag that is configured to show the evidence of a particular protein that is part of the nF-κB pathway in cells of the region of interest. The protein tag highlights the relevant protein in the cells and thus represents the signaling pathway in the image data. In other words, the NF-kB acts as a detection mechanism for the fluoroscope (remote imaging device). For example, once a sample of cells from the brain tissue is extracted, the NF-kB, (or any other protein or antigen tag) can be introduced to the tumor cells so that as the cells divide, the resulting cells will also have NF-kB within them. The fluoroscope will detect the NF-kB in cells and allow for visualization of cells containing NF-kB, which include tumor cells.

The remote monitoring device 110 (e.g., a fluoroscope) can be used capture this image data. The image data are received by the data processing device 120 and the machine learning model 170 compares this image data to stored image data in the data store 160 (e.g., a data warehouse such as described in relation to FIG. 3). The machine learning model 170 generates output data that represents how particular cells are proliferating in the tissue. The level of proliferation and corresponding detected level of nF-κB activation are thus related to each other. The prediction score can be generated based on the level of nF-κB activation detected, which represents a rate of the cell growth in the sample. Other proposed relationships can be investigated and integrated into the machine learning model 170 and prediction score.

Figure 2A:
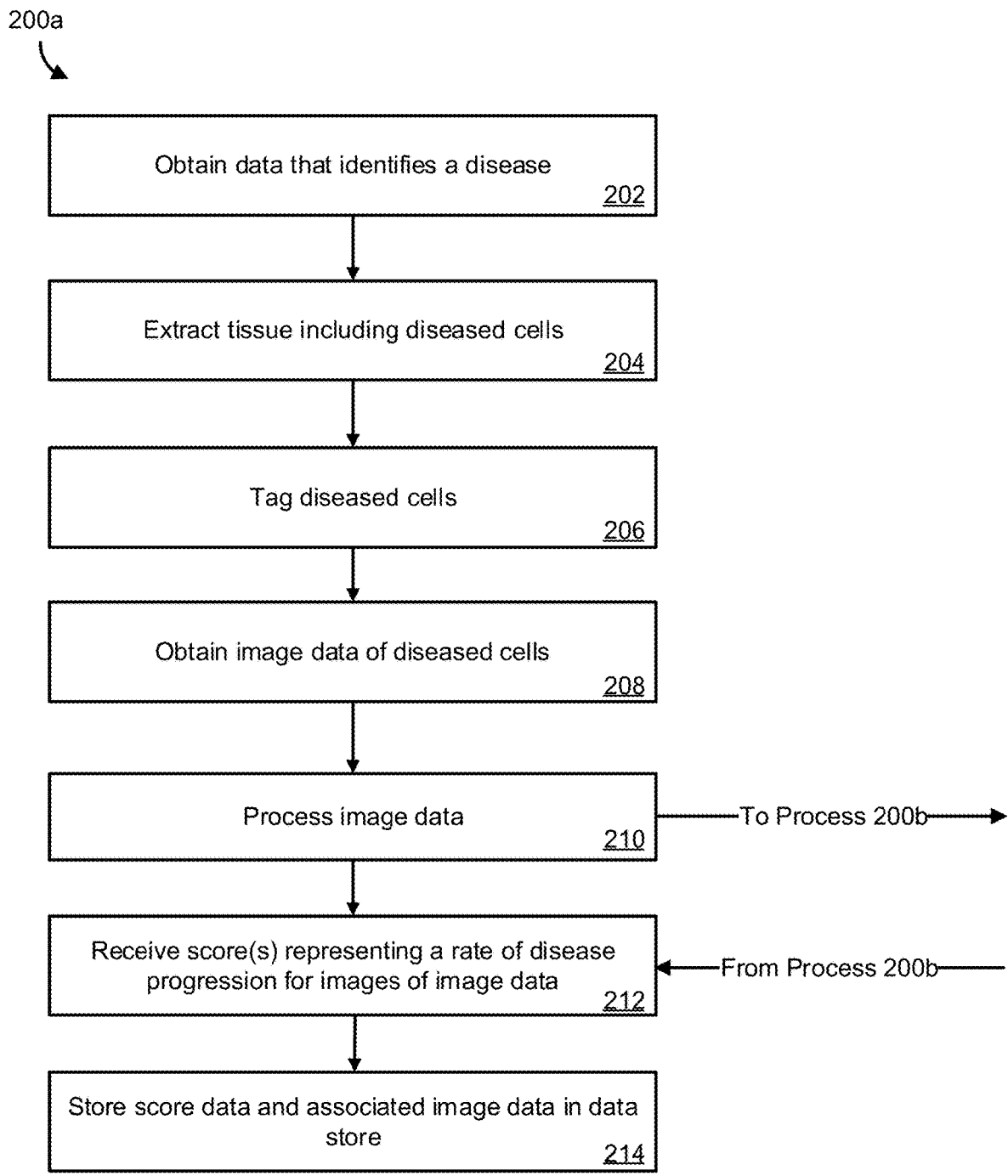
FIGS. 2A-2B each show a flow diagram of an example process for estimating disease progression.
Figure 2B:
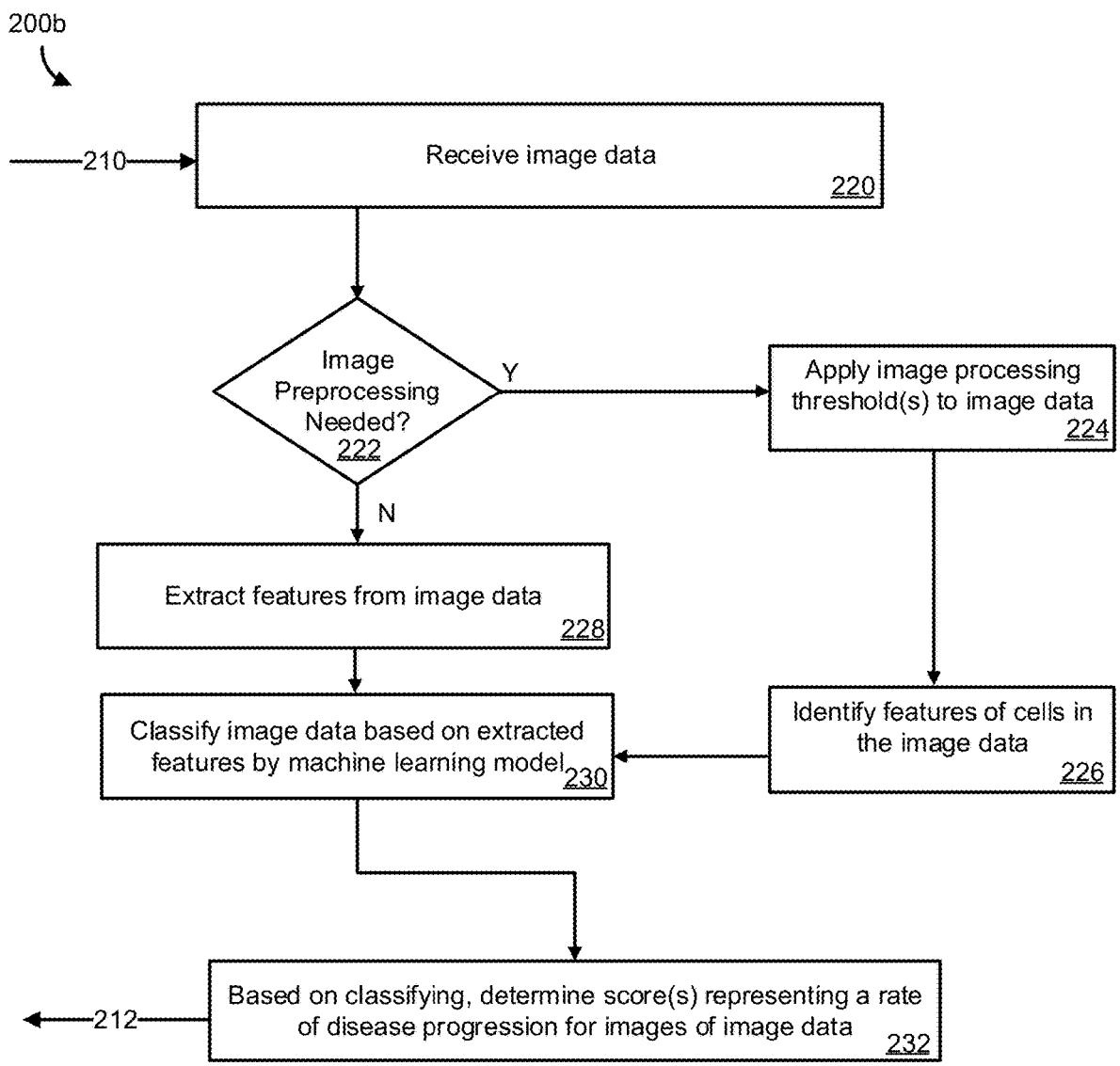

FIGS. 2A-2B each show a respective flow diagram 200a, 200b of an example process for estimating disease progression (such as a growth rate for GBM) in a patient by data processing system 100 of FIG. 1. The process 200a of FIG. 2A includes obtaining (202) data that identifies a disease. This data can include a specification by the physician (or other user of the data processing system 100) of a disease of interest (e.g., though a user interface of the client device 140). For example, the physician may indicate that the disease is a GBM tumor. Selection of the disease type results in a selection of a particular trained machine learning model (e.g., model 170) for analysis of the patient data (e.g., image data) and prediction of disease progression for the particular disease.

To prepare the image data for analysis by the data processing system 100, tissue is extracted (204) which includes diseased cells. The tissue is extracted from the patient for which the disease progression is being predicted by the data processing system 100. For example, a biopsy can be performed on the patient. The diseased cells are tagged (206), such as with a protein tag as previously described. Other tagging mechanisms can be used to distinguish the diseased cells (or cells of interest) from other cells in the extracted tissue. The tagged cells and extracted tissue are imaged (208), such as by using the remote monitoring device 110. For example, when the tagging includes fluorescent tagging, a fluoroscope is used to extract images of the tagged cells. In some implementations, an antigen tag is used to identify cells of interest.

In an aspect, the data processing system is configured to verify the role of the GBM tumor microenvironment on the rate of GBM tumor growth based on the features extracted from the image data. The data processing system is configured to process data representing an amplified existing pcDNA-FLAG plasmid. The plasmid is transformed into DH4α bacteria. The DNA is eluded from plasmid midi prep. The size is confirmed by gel electrophoresis. The pcDNA-FLAG sequence and NF-κB sequence are cut out of the pUC57 plasmid with restriction enzymes. NF-κB proteins are cloned into pcDNA-FLAG vector. In this example, a T4 Ligase is used to attach sticky ends. The ligation is transformed into DH4α bacteria. The size is confirmed with gel electrophoresis. Once small molecules are introduced to produce multiple activations of NF-κB, the data processing system is configured to count the cells in each of the three conditions to evaluate differences in cell growth rate.

In an aspect, depending on the disease type, data acquisition can be performed in an autonomous or semi-autonomous process by the remote monitoring device 110. The remote monitoring device 110 can be configured to receive data over time that represents a molecular and cellular microenvironment of a disease-causing tumor, virus, bacteria, or any other agent in the patient. The data that is obtained by the remote monitoring device 110 is received by the machine learning model 170, as subsequently described, to estimate the rate of disease progression. For example, tumor cells can be cultivated and imaged under a scanning electron microscope or fluoroscope. Virus-infected cells or bacterial cells can be cultivated in a medium and imaged under a transmission electron microscope or scanning electron microscope. In some implementations, the remote monitoring device 110 is controlled remotely over the network 130 to obtain images data representing cells of interest. The images are obtained over a period of time, such as at defined intervals or in real time or near real-time. In this disclosure, real-time refers a time period representing a current or present time and for which delays are due to processing delays or communication delays (rather than data storage for processing at a later time). A processing delay can be seconds or even minutes in this context, but is intended to refer to data processing of approximately contemporaneous data.

The remote monitoring device 110 (e.g., a fluoroscope) can include a multi-fluorescent imaging device. In some implementations, the remote monitoring device 110 includes the data processing device 120 for performing image analysis and cell detection at the device 110. The remote monitoring device 110 can be configured to detect cells of interest and their features as described below. The remote monitoring device 110 can be configured to remotely and/or autonomously operate time-lapse experiments to continuously obtain image data of a region of interest and determine a number of tagged cells in the region at predefined time intervals. The device 110 provides an alternative for manual counting of cells. In some implementations, the remote monitoring device 110 (e.g., by the data processing device 120 associated with the remote monitoring device or included in the remote monitoring device) detects that the number of cells is changing (e.g., increasing) above a threshold rate. In this example, the cells are growing at an accelerated pace relative to a benchmark growth rate. The remote monitoring device 110 can automatically adjust a length of predefined time intervals to obtain image data at an increased rate. The data processing device 120 associated with the remote monitoring device 110 can be configured to adjust the rate dynamically in response to cell proliferation rate (as previously stated). In some implementations, the data processing device 120 generates a notification indicating that a threshold proliferation rate has been exceeded (e.g., for presentation on a client device 140). In some implementations, the remote monitoring device 110 is configured to receive an intermittent or continuous supply of cell cultures, rather than require manual loading of one culture at a time.

Turning to FIG. 2B, the process 200b is performed for processing (210) the image data as shown in process 200a of FIG. 2A, such as by the data processing device 120 of FIG. 1. In an aspect, processing the image data can include preprocessing the image data with an image processing module to prepare the image data as an input for a machine learning model (e.g., machine learning model 170 of FIG. 1). The specific type of machine learning model can be one of a variety of models. An example machine learning model including a convolutional neural network is subsequently described in relation to FIG. 9.

The data processing device 120 receives (220) the image data. The image data can be received from a data store (e.g., data store 160 of FIG. 1) or another data source. In an aspect, the image data are received from the remote monitoring device 110 over the network 130. The data processing device 120 determines (222) whether image processing is to be performed for preparing the image data for the machine learning model. This determination can be based on metadata associated with the image data that specifies a configuration of the image data. For example, the metadata can specify that the image data match a particular input format for the machine learning model.

To prepare the image data for the machine learning model, the data processing device 120 processes (224) the image data obtained over time by the remote monitoring device 110. The data processing device 120 is configured to determine how many cells have proliferated by automatically analyzing the number of tagged cells. The image processing module processes (224) the image data using one or more image processing techniques. The image processing module can apply filters, threshold pixel values in various image spaces (e.g., RGB, HSL, HSV, etc.), perform boundary detection, pattern detection, line detection, and so forth. Images over time of a tissue sample can be compared to one another to facilitate analysis. In an example, the data processing device 120 determines boundaries of the tagged cells and identifies whether the tagged cells have proliferated over time. The exact thresholds and features that are detected by the image processing module can be set based on the machine learning model 170 selected for analysis of the images.

The image processing techniques can extract or identify (226) features from the image data that are inputs to the machine learning model. For example, the data processing device 120 can generate a feature vector from the image data. The feature vector is an input to the machine learning model. The features can represent quantitative data and/or qualitative representations of a diseased area of the brain. The values in the feature vector can each represent a particular parameter (e.g., a physically descriptive value) of a portion the image data. For example, a given value of the feature vector may indicate how many tagged cells are present in the image. A given value of the feature vector may indicate a shape or size of cells or nuclei in the image. A given value of the feature vector may indicate an image texture. For example, the value may indicate that regions or portions of the image are smooth with smaller pixel value variance or rough with a larger pixel value variance. A given value of the feature vector can indicate cell density in the image. A given value of the feature vector can indicate patterns of migration of cells relative to neighboring cells. These features can provide meaningful insight into how the differing microenvironments can affect the rate of disease progression. The features listed here are examples and form a non-exhaustive list. As such, other features can be included in the feature vector, and these features can be included in any combination and may depend on the particular machine learning model applied. In an aspect, the data processing device 120 can extract (228) features from the image data without extra image processing steps.

The data processing device 120 is configured to classify (230) the image data based on the feature vectors associated with the image data and/or the extracted features of the image data. The feature data are input into a machine learning model. In some implementations, a convolutional neural network (CNN) (or other machine learning model) compares the data feature vector to features of baseline images stored in a data warehouse (e.g., data store 160 of FIG. 1). The baseline images (also called an image library) is described in further detail with respect to FIG. 3. For each disease of interest, the image data warehouse includes different baseline rates of growth from prior analysis. The baseline rates of growth are associated with the image data in the data warehouse and the features of those images. More specifically, the machine learning model 170 is trained using data from the data warehouse. The machine learning model 170 receives input data, such as the image data itself or feature vectors representing the image data, depending on the machine learning model being used. The machine learning model 170 generates an output that matches (e.g., classifies) the image data and/or feature vector to a rate of disease progression. In an example, the machine learning model 170 classifies the image data as matching particular images in the data warehouse that represent (or are otherwise associated with) particular values for the rate of disease progression for the disease being analyzed. In some implementations, the machine learning model 170 classifies the features of the feature vector as representing a particular rate of disease progression.

The data processing device 120 uses the output classification of the machine learning model 170 to generate (232) a score for a rate of disease progression for the patient. The score includes a rate value which indicates which data from the data warehouse are similar to the input data to the machine learning model 170. If the input data closely matches a data stored in the data warehouse that is assigned a higher value for the rate of disease progression, the match value for the image data indicates a higher rate of disease progression for the patient. If the input data closely matches a data stored in the data warehouse that is assigned a lower value for the rate of disease progression, the match value for the image data indicates a lower rate of disease progression for the patient. For example, an output of the machine learning model 170 includes a progression rate score ranging from 1 (slowest rate) to 100 (fast rate) that represents the rate of disease progression. Each score indicates the percentile of the patient in relation to scans with known disease progression rates. In this example, a score of 70 indicates that the disease growth rate is greater than 70% of known disease growth rates.

The score value is stored (214) in the data store 160. The score can be used by one or more downstream applications, as previously described. In some implementations, the score data can be associated with the image data in the data store 160.

Figure 3:
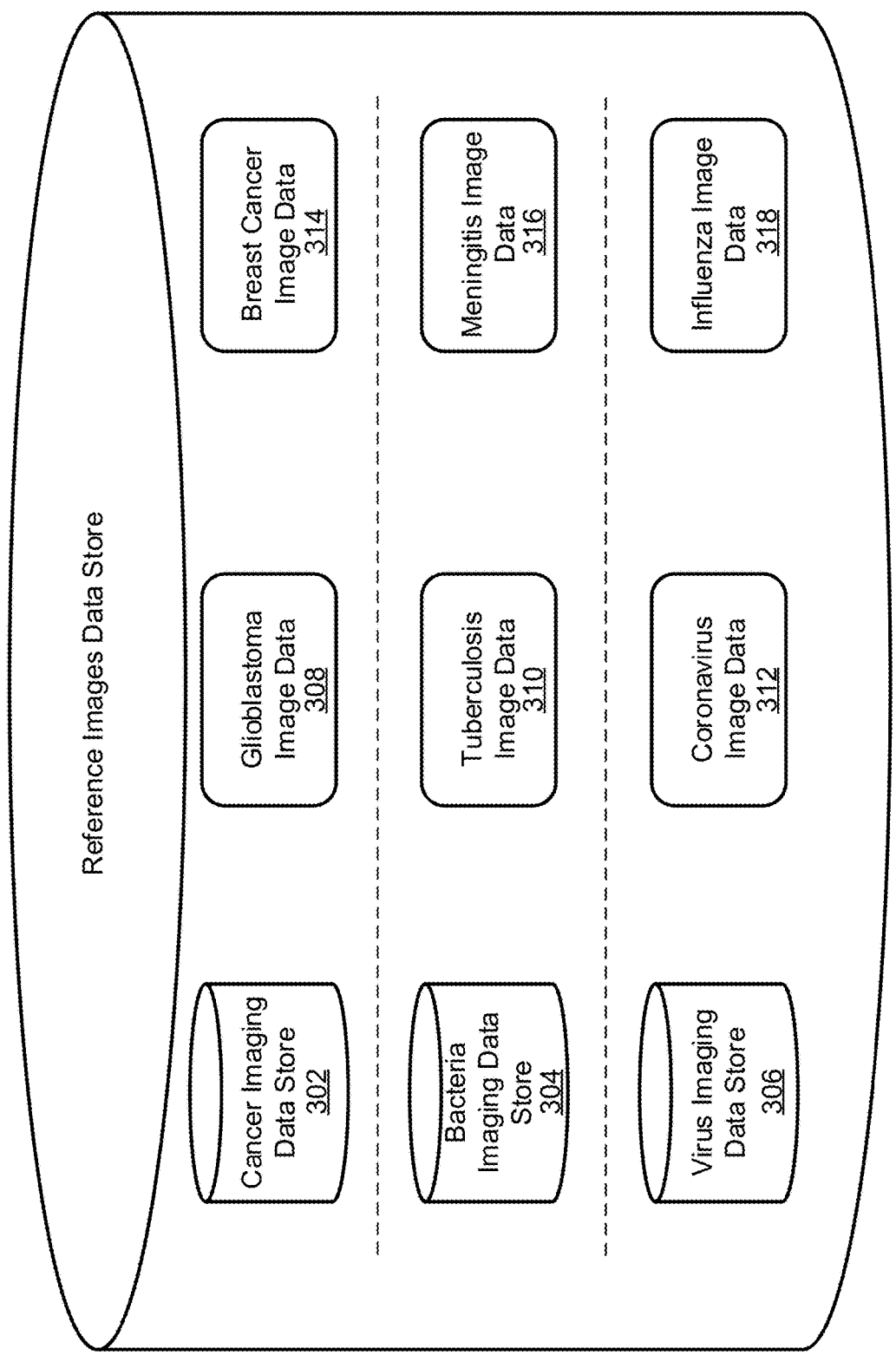
FIG. 3 is an illustration of an example data store including examples of data sources.

FIG. 3 is an illustration of an example data store 300 including examples of data sources for training data for the machine learning model (e.g., the machine learning model 170 of FIG. 1). In some implementations, the data store 300 can be a part of data store 160 of FIG. 1. The data store 300 includes libraries of images of diseased tissue for a variety of disease types. For example, the data sources include a cancer imaging data store 302, a bacteria imaging data store 304, and a virus imaging data store 306. Each of the data stores 302, 304, and 306 is configured to include image data for many different diseases. The images are associated with disease progression rates that are known. For example, a cancer representing in the cancer imaging data store 302 can be associated with a library of images that represent different stages of development of the cancer and different rates of progression for the cancer. The images are associated with score values indicating the rates of disease progression represented in the images. The machine learning model 170 classifies input data received using the images from the data store 300 as previously discussed.

The cancer imaging data store 302 can include images for a wide variety of cancers. For example, the cancer imaging data store 302 includes glioblastoma image data 308 and breast cancer image data 314. These image libraries enable the machine learning model 170 to classify images received for glioblastoma and for breast cancer to determine rates of disease progression. While these two diseases are shown, other cancers can be included where training data are available. The cancer imaging data store 302 can include metadata associating particular features of the image data in the data store with particular rates of disease progression. These metadata can be used for configuration of the machine learning model 170 when applied to a disease type representing in this data store 302. For example, the weights or biases applied to inputs and the particular activation functions (e.g., synapse weights) used in a neural network can be configured in a particular way for cancers, but configured differently for bacteria or viruses represented in data stores 304 and 306.

Similar to data store 302, the bacteria imaging data store 304 can include images for a wide variety of bacteria based diseases (e.g., infections). For example, the bacteria imaging data store 304 includes tuberculosis image data 310 and meningitis image data 316. These image libraries enable the machine learning model 170 to classify images received for tuberculosis and for meningitis to determine rates of disease progression for these diseases. While these two diseases are shown, other bacteria based diseases can be included where training data are available.

Similar to data stores 302 and 304, the virus imaging data store 306 can include images for a wide variety of virus based diseases. For example, the virus imaging data store 306 includes coronavirus image data 312 and influenza image data 316. These image libraries enable the machine learning model 170 to classify images received for coronaviruses and for influenza in patients to determine rates of disease progression for these diseases. While these two diseases are shown, other viral diseases can be included where training data are available.

In some implementations, the data processing system can be configured to use different machine learning models based on the type of disease being analyzed. For example, different machine learning models can be based on the disease data that is available for a particular disease type. A particular machine learning model or a combination (ensemble) of machine learning models that provides the highest accuracy and specificity can be chosen as a default for a specific disease. For each disease, parameters for identifying the diseased cells may depend on the fluorescence of disease cells and their images by manipulating the HSV upper & lower ranges, blur, dilution of the images.

In some implementations, other patient data can be input into the data processing system 100 in situations where one or more factors of the machine learning model relate to information about the particular patient. This data can include treatment history, -omics data (e.g., genetic profiles), electronic medical records (EMR), demographics data, patient history data, registry data, and so forth. For example, EMR data includes records associated with individual patients. The EMR data can include self-reported data of the patient. The EMR data can include data obtained from physicians or other medical service providers from interacting with the patient. For example, the EMR data include a medical history for the patient, such as medical operations the patient has experienced, illnesses the patient has experienced, and physiological data associated with the patient. Omics data includes genetic or molecular profiles of humans. The omics data includes genomes and the interrelationships of particular genes. The omics data can be used to provide context to other patient data, such as data acquired from patient registries and/or from EMR data. For example, the omics data can be used to predict how a patient may respond to treatment for a disease, and how the patient's disease may progress if left untreated. Registries data includes a clinical data registry, also called a patient registry or disease registry. The registries data includes a database that collects, organizes, and displays healthcare information, generally related to a particular disease (e.g., GBM) and for a patient population. The registries data can be structured such that trends across patient populations are identifiable. For example, the trends can indicate how GBM has processed in similar patients. The registries data can include results of studies such as datasets for living patients with GBM. The trends can associate symptoms with scores that have been assigned to those symptoms and how the disease has progressed over time. The registries data can be combined with the omics data and the EMR data to establish patient trends and track treatment outcomes. The data processing system can thus account for demographic factors for a more representative comparison among individuals.

Figure 4A:
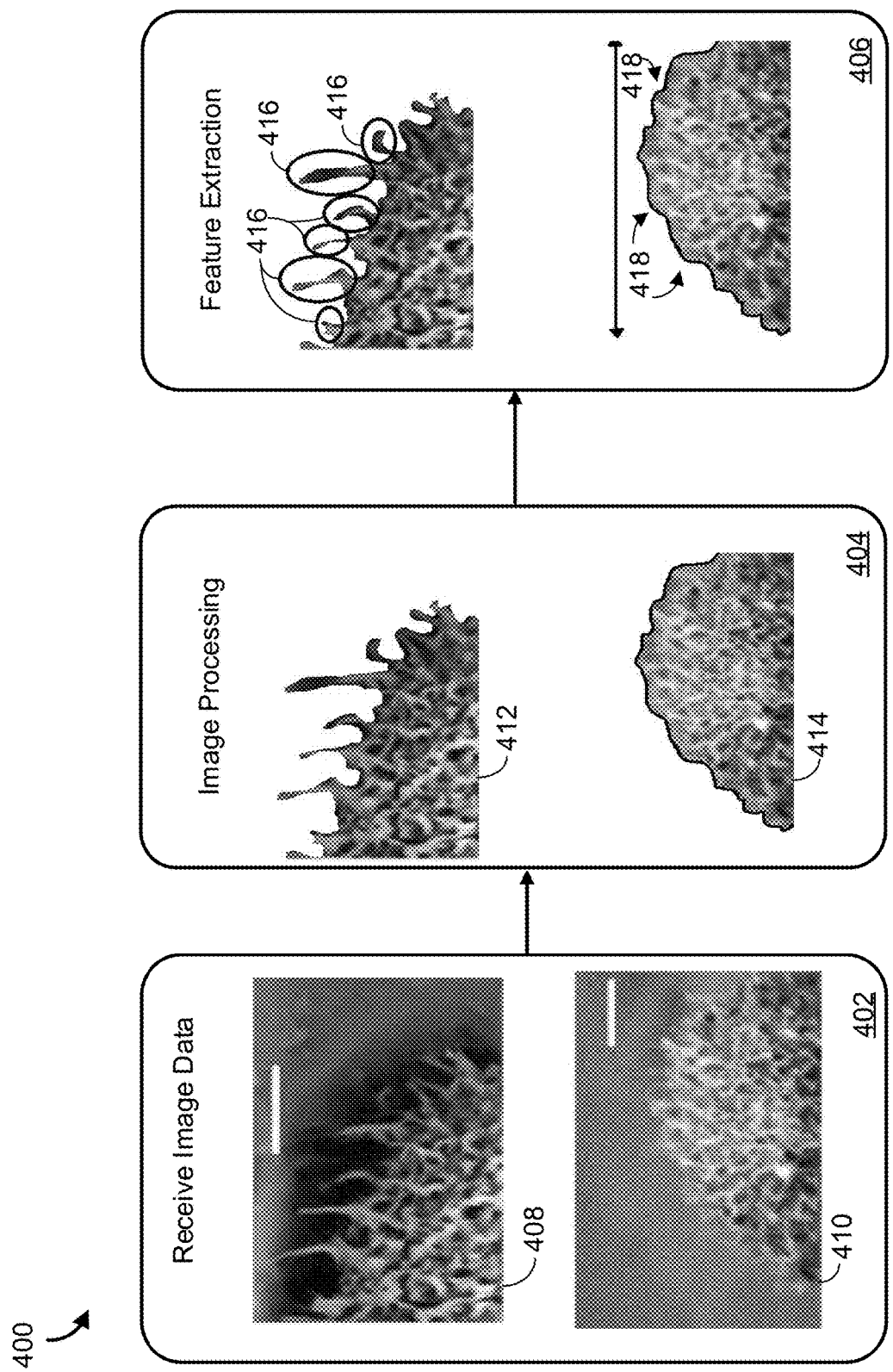
FIGS. 4A, 4B, and 4C illustrate an example process for estimating disease progression for GBM using machine learning models.
Figure 4B:
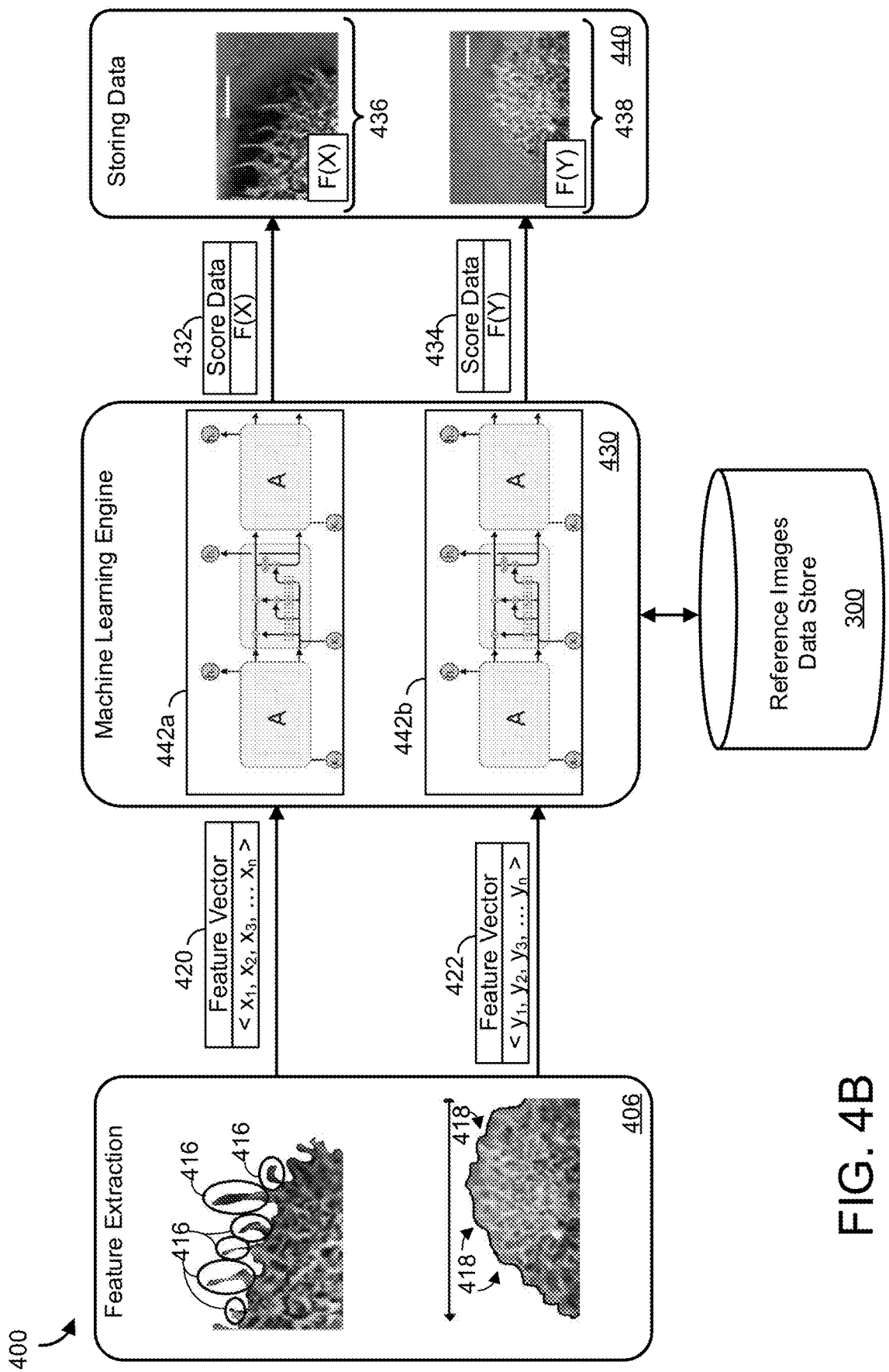
Figure 4C:
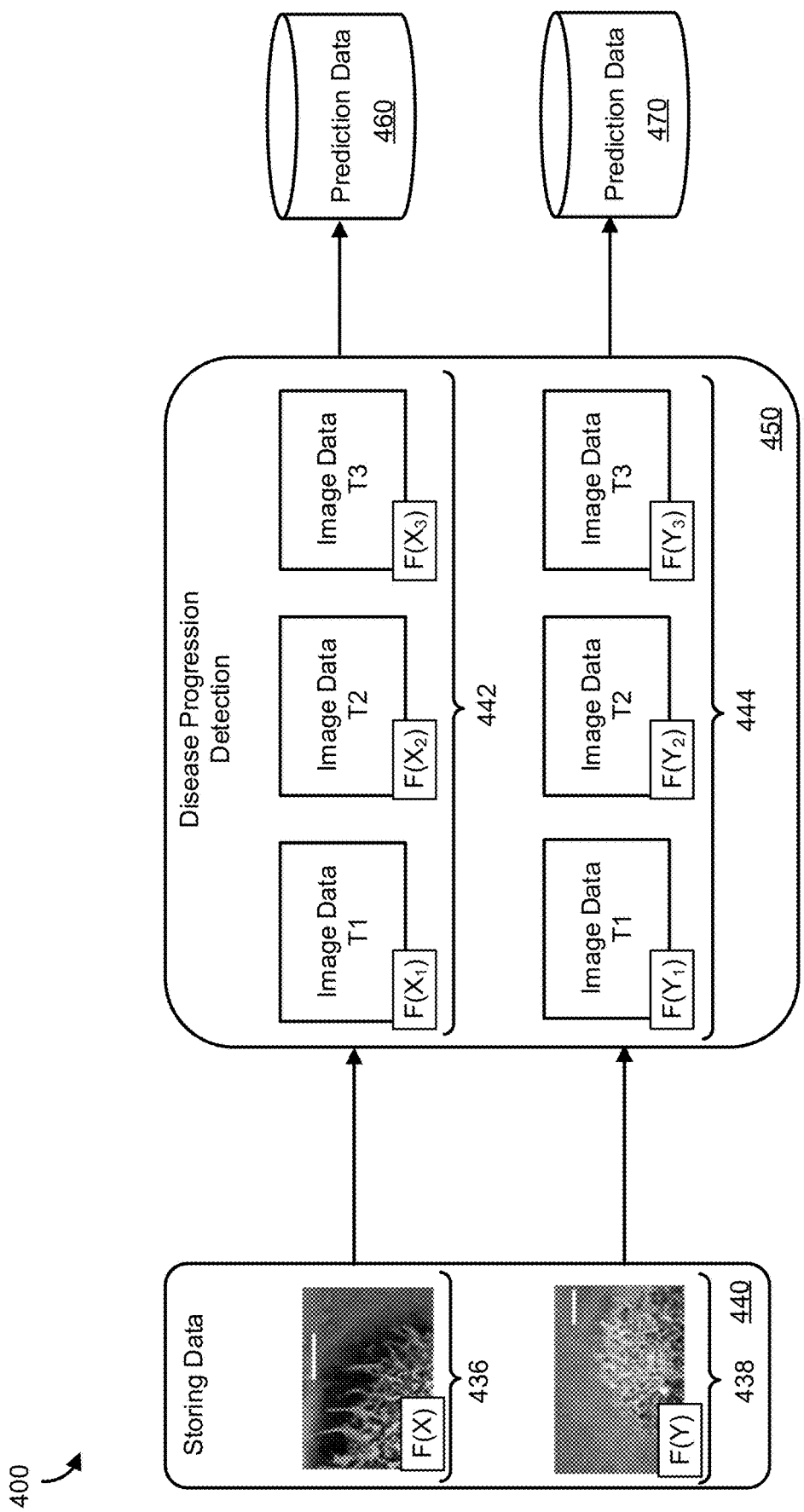

FIGS. 4A, 4B, and 4C illustrate an example process 400 for estimating disease progression for GBM using machine learning models. FIGS. 4A-4C show parallel analysis of images of malignant (408) and healthy (410) tissue for classification of the disease progression rate for each situation. At step 402, an image of the tissue is obtained. Image 408 shows a malignant tumor with elongated growths that indicate malignancy. Image 410 shows benign tissue for the same tissue type.

FIG. 4A shows initial steps of the process 400. In process 400, a data processing device (e.g., data processing device 120 of FIG. 1) is configured to perform an image processing step 404. In this example, the tissue border is extracted separating the cells of interest from the medium or other material represented in the image. In image 412, the cell shape indicates elongated features. Image 414 represents the cell shape that is relatively smooth. A feature extraction step 406 is configured to recognize the smoothness of the shape of the cells for images 412 and 414. For example, the boundary drawn during the image processing step 404 has a plurality of elongated features 416 which are extracted at the feature extraction step. The smoother boundary features 418 of image 414 are also extracted. The features 416, 418 can each be associated with a smoothness factor (e.g., a value) that is included in a feature vector.

Turning to FIG. 4B, the next steps of the process 400 are shown. Feature vectors 420, 422 are generated from images 412 and 414, respectively. The feature vectors include values representing the features extracted from the images 412 and 414. While boundary smoothness is described as an example, the feature vector can include other features, such as cell size, cell nucleus size and shape, a number of cells identified in the image, a density of cells identified in the image, and so forth as applicable. In some implementations, the image data itself can be a part of the feature vector, such as a matrix in which the values represent the pixels of the image. At step 430, a machine learning model 442 (e.g., machine learning model 170 of FIG. 1) is configured to receive the feature vectors 420 and 422. While the process is shown in parallel in FIG. 4B, generally the machine learning model 442 processes each feature vector in sequence, or multiple instances 442a, 442b of the machine learning model are implemented for processing the feature vector data. Generally, the machine learning model 442 receives baseline image data from the data store 300, as previously described. The baseline images are used for classification of the feature vectors 420, 422 and/or image data as representing a particular rate of disease progression. Score data 432, 434 for each respective image 412, 414 are output by the machine learning model instances 442a-b. The score data 432 and 434 are associated with the respective initial images 408, 410 as structured data 436 and 438 in a data store (e.g., data store 160). The structured data entries 436, 438 include each image and their associated scores representing rates of disease progression associated with each image. In some implementations, the structured data entries 436, 438 an also include metadata for further data organization, such as a patient identifier, disease type identifier, time stamps, and so forth.

Turning to FIG. 4C, the process 400 includes additional steps for using the structured data entries 436, 438 that each include scored images. A disease progression detection step 450 can analyze sequences 442 and 444 of scored images for a particular patient. In some implementations, the sequence 442 of scored images represents images taken of a region of interest for a patient over a period of time (e.g., at given time intervals). In some implementations, the sequences 442 and 444 can be used for generating visualizations of the disease progression for a patient, class of patient, disease type, and so forth in one or more downstream applications. In some implementations, the sequences 442 and 444 are used to adjust the disease progression prediction for a patient. Prediction data 460 and 470 are generated from one or both of the entries including scored images 436, 438 and the sequences 442 and 444 of entries of scored images.

Figure 5:
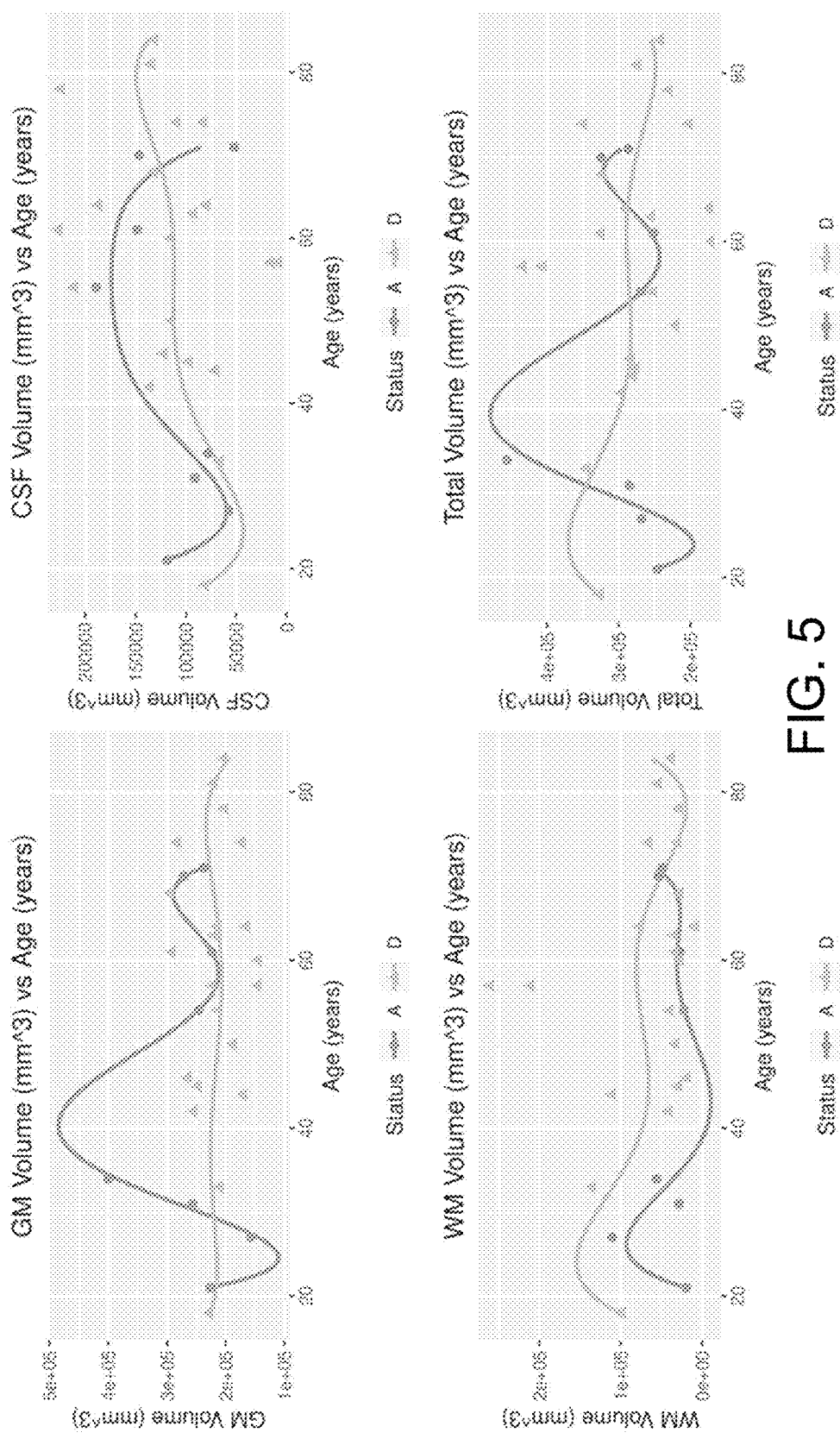
FIGS. 5-7 each illustrate example results of estimating disease progression for GBM using sample data.
Figure 6:
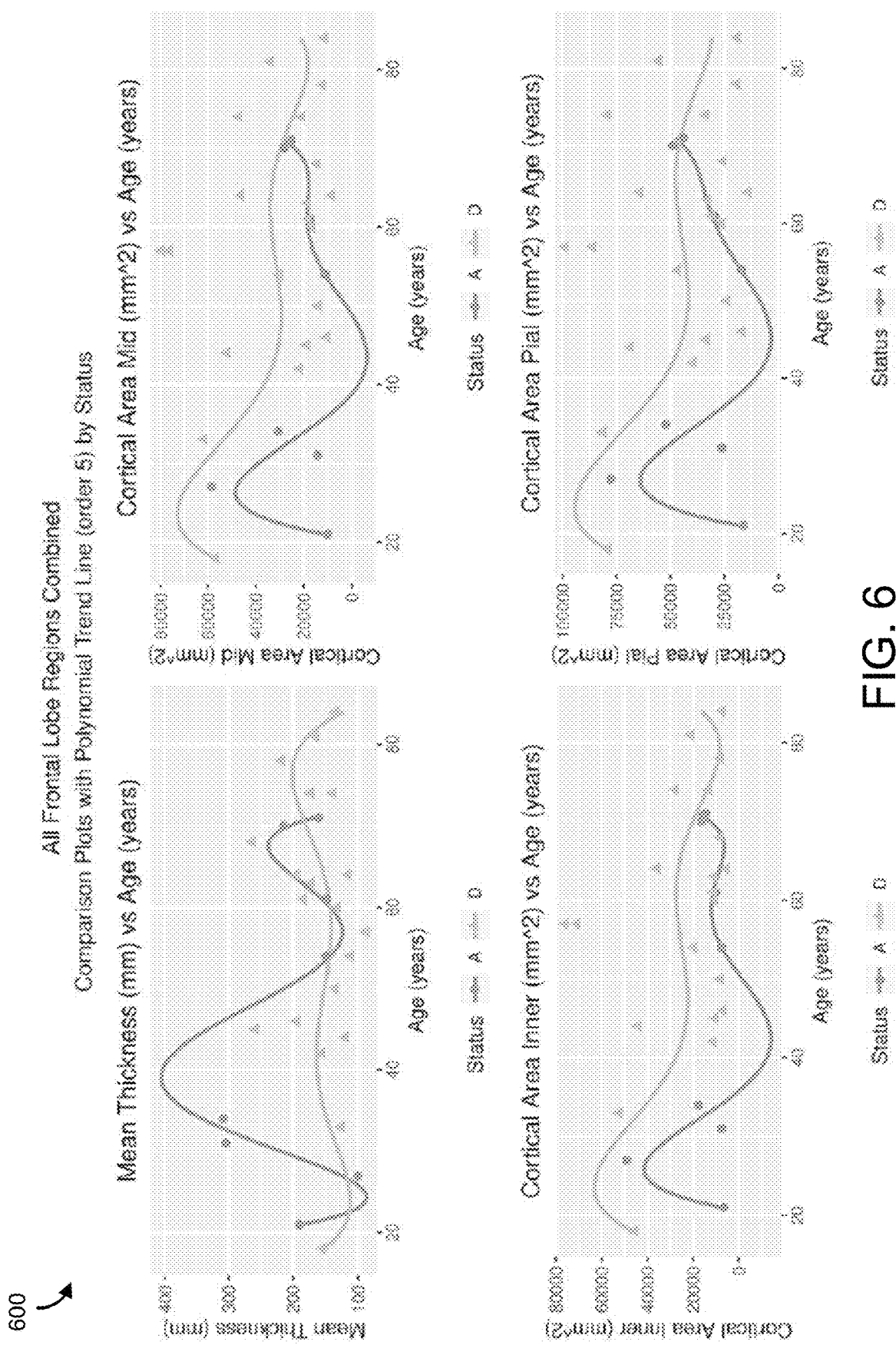
Figure 7:
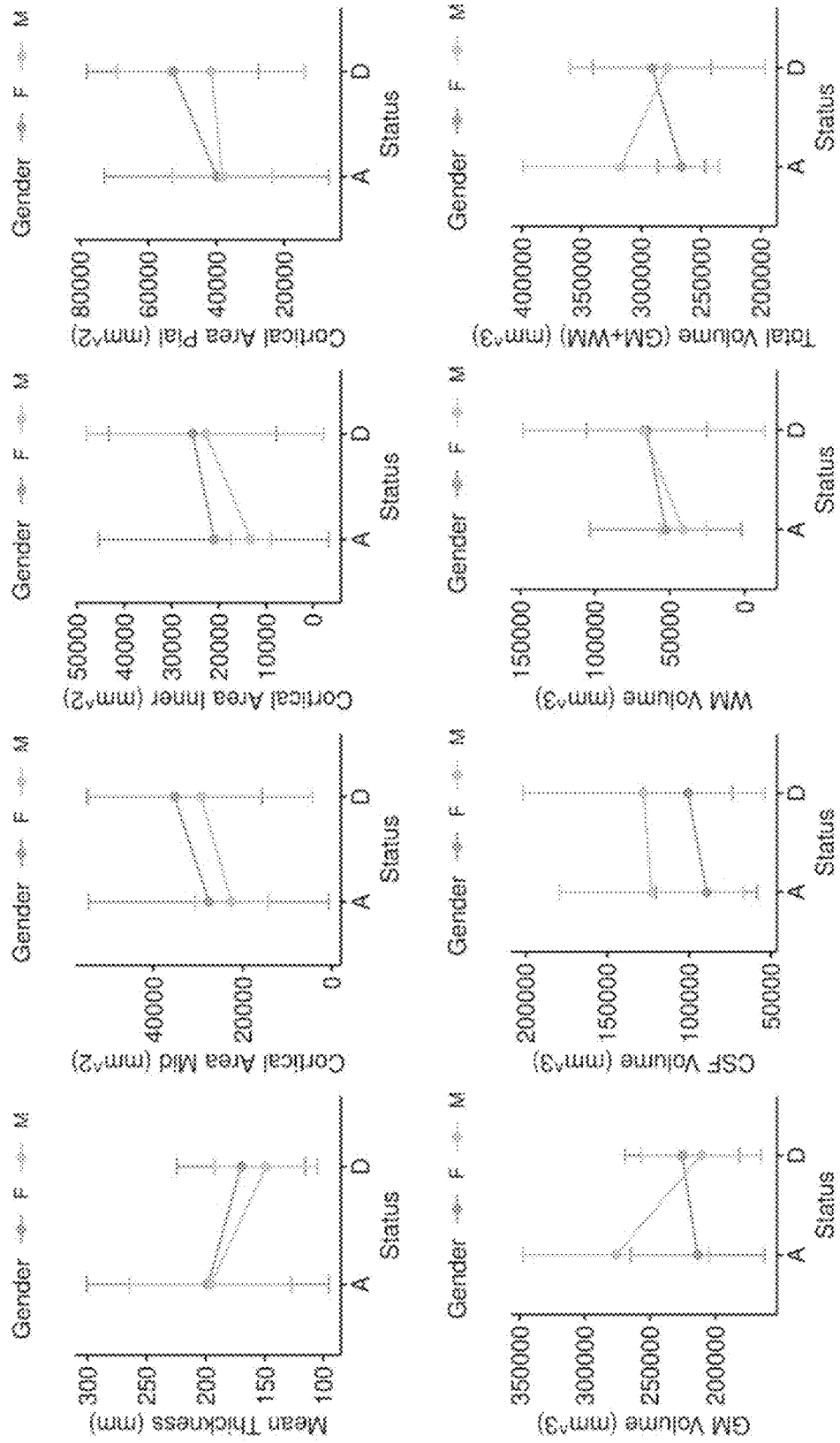

FIGS. 5-7 each illustrate example results of estimating disease progression for GBM using sample data. An example embodiment for obtaining the results data 500, 600, and 700 of FIGS. 5-7 is now described. This example includes a data processing system (e.g., data processing system 100 of FIG. 1) that is configured for estimating glioblastoma tumor growth rates by determining volumes, thicknesses, and surface areas of regions within the frontal lobe of the brain. The image data for this embodiment includes fMRI image data of a brain region of patients. The growth rates of the GBM tumor is determined by applying the machine learning model (e.g., machine learning model 170 of FIG. 1) to the fMRI image data. Baseline data includes images of tissue with typical NF-κB activation levels. Results 500 show values of the mean thickness values for regions including cortical area inner region, mid region, and pial for frontal regions for alive and diseased patients. Results 600 show GM volume, CSF volume, WM volume, and total volume vales for frontal regions for alive and diseased patients. Results 700 show all volumes for frontal lobe regions combined for alive and diseased patients. The results data 500 and 600 visualize the machine learning model. The results data 500 and 600 show trends relating to demographic factors, which facilitates estimation of the disease progression rate. Generally, the characteristics about volumes and thicknesses of the frontal lobe do not directly correlate with the machine learning model that is related to the images of the cells. The various characteristics of the brain, such as CSF volume, GM volume, etc. cannot be measured by the remote monitoring device, as that is only used to image cells. However, these characteristics may provide additional information about disease progression that can corroborate results of a machine learning model.

The data processing system obtains and analyzes the fMRI scans for identifying effects of GBM. The GBM fMRI image data are obtained by the data processing system (e.g., from a data source including a cancer genome atlas from the Cancer Imaging Archive). In this embodiment, the image data represented individuals with GBM who are alive, including 12 males ages 23-71 with a mean age of 56.833, and 7 females ages 21-72 with a mean age of 40.857. The image data also represented individuals with GBM who are deceased, including 35 males ages 40-78 and a mean age of 60.429, and 22 females ages 18-84 with a mean age of 61.636.

The data processing system preprocesses the fMRI image data prior to inputting the image data (or portions thereof) into the machine learning model. The data processing system performs several image processing functions configured to isolate the desired portions of the image representing the brain tissue. These operations are configured to remove the skull, scalp and any non-brain tissue from the MRI. The image processing functions are configured to generate a 3D surface for the skull and scalp. The image processing functions include a non-uniformity correction that corrects skull-stripped MRI image data for shading artifacts.

The image processing functions include tissue classification in the images. The data processing system classifies each voxel according to tissue types present within the extracted brain to estimate fractional measures of grey matter, white matter, and Cerebrospinal fluid (CSF) in the brain.

The data processing system preprocesses the fMRI image data prior to inputting the image data (or portions thereof) into the machine learning model. The data processing system performs several image processing functions configured to isolate the desired portions of the image representing the brain tissue and estimate fractional measures of grey matter, white matter, and Cerebrospinal fluid (CSF) in each region of interest within the brain. These data are stored as feature data with the image.

The data processing system is configured to determine a cortical mean thickness, inner cortical surface area, mid cortical surface area, pial cortical surface area, GM volume, CSF volume, WM volume, and total volume for each region of interest. Again, these data can be stored as features in a feature vector representing the image. In some implementations, the results of surface volume registration are grouped according to each ROI.

The data processing system is configured to perform statistical analyses to identify differences caused by GBM in each ROI for all measure. The statistical tests used can include one or more of Anova, the Tukey HSD Test, a General Linear Hypothesis Test (GLHT), a Pairwise T-test, a Shapiro-Wilk Test, or a Kruskal-Wallis Rank Sum Test. The data processing system identifies ROIs that show statistical significance (e.g., p<0.05).

In the embodiment related to results 500, 600, and 700, the following example machine learning models and training data are used. Supervised learning is used to train the machine learning model with 76 subjects*66 ROI*8 statistics*2 trials to result in 80,256 data points. Accuracy metrics for fMRI include K-nearest neighbors (KNN): 0.444; Support Vector Machines (SVM): 0.444; Decision Tree: 0.680; Random forest classification (RFC): 0.716; Neural Network (NN): 0.778; and Logistic Regression: 0.778. In some implementations, bootstrap aggregating is used for creating a machine learning ensemble to improve the stability and accuracy of the model with Decision Tree, K Nearest Neighbors, and Logistic Regression.

The results 500, 600, and 700 show that, in the pathophysiology of GBM, evidence from neuroimaging, neuropathological, and lesion analysis studies implicates neurocognitive deficits that are associated with frontal lobe function. Primarily composed of abnormal astrocytic cells, blood vessels, and dead cells from necrosis, GBM tumors invade nearby regions of the brain and may spread to the opposite hemisphere through the corpus callosum, adequately nourished by a large tumor vessel blood supply. The output values of the machine learning model show the differences in various measures of brain regions of interest and that the frontal lobe region is profoundly affected in GBM, based on the fMRI scans of living and deceased individuals with GBM. For example, thickening of the cortical layers (inner, mid, pial) is a structural marker for numerous conditions, including traumatic brain injury, epilepsy, and neurodegenerative diseases. This is corroborated by the machine learning model which indicating that living individuals with GBM have a greater surface area of cortical layers when compared to deceased individuals.

The results 500, 600, and 700 show that the frontal lobe is affected by GBM from analysis of fMRI data on various regions of interest in the brain. Measures for cortical area mid, cortical area pial, cortical area inner, and white matter volume in the frontal lobe have a statistically significant effect (pAnova<0.05) on GBM progression. Living individuals with GBM have greater mean thickness, GM volume, CSF volume, and total volume, and lesser cortical area mid, cortical area inner, cortical area pial, and WM volume in the frontal lobe than deceased individuals with GBM. Females with GBM have greater mean thickness, cortical area mid, cortical area inner, WM volume, and lesser GM volume, CSF volume, and total volume in the frontal lobe than males with GBM. The machine learning ensemble model in this embodiment were validated to an accuracy of 0.7930, thus providing an efficient means for better understanding the rate of disease progression of GBM. The machine learning model can result in an improved diagnosis, timely intervention, and treatment for GBM. Analyzing various measures of the frontal lobe regions of interest can provide insight into varying rates of GBM disease progression, which is crucial for minimizing the treatment costs and deaths caused by GBM.

Figure 8:
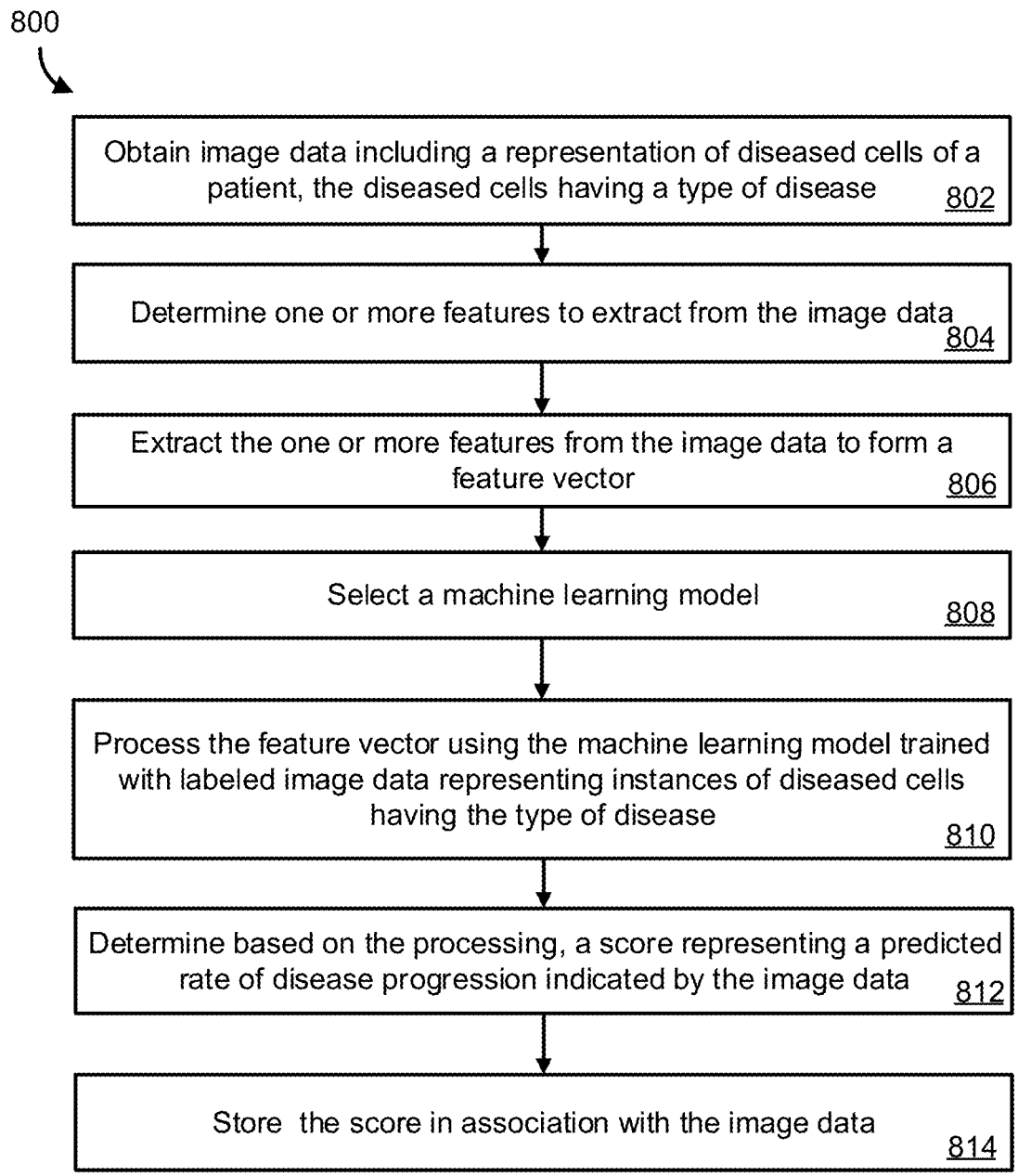
FIG. 8 is a flow diagram illustrating an example process for estimating disease progression for GBM.

FIG. 8 is a flow diagram illustrating an example process for estimating disease progression for GBM. The process 800 includes obtaining (802) image data including a representation of diseased cells of a patient, the diseased cells having a type of disease. The process 800 includes, based on the type of the disease, determining (804) one or more features to extract from the image data, the features each representing a physical parameter of at least one of the diseased cells represented in the image data. The process 800 includes extracting (806) the one or more features from the image data to form a feature vector. The process 800 includes, based on the type of the disease, selecting (808) a machine learning model. The process 800 includes processing (810) the feature vector using the machine learning model, the machine learning model being trained with labeled image data representing instances of diseased cells having the type of disease, the labeled image data associating scores representing predicted rates of disease progression with the respective instances of diseased cells having the type of disease. The process 800 includes determining (812), based on the processing, a score representing a predicted rate of disease progression indicated by the image data. The process 800 includes storing (814), in a data store, the score in association with the image data.

In some implementations, the cells of the image data are tagged with a protein tag. Eextracting the one or more features from the image data comprises identifying cells having the protein tag in the image data. In some implementations, the protein tag is configured to fluorescently label cells in an nfKb signal pathway, and wherein the type of disease comprises a glioblastoma multiforme (GBM) tumor. The process 800 can include including, in the feature vector based on the nfKb signal pathway that is labeled, a feature value representing the nfKb signal pathway. The process 800 can include processing, using the machine learning model, the feature value. The process 800 can include determining, based on the processing, the score representing the predicted rate of disease progression, wherein the disease progression represents a growth rate of the GBM tumor.

In some implementations, the image data include a series of images including the diseased cells of the patient and captured at time intervals, and wherein each image of the series of images is associated with a respective score to form a sequence of scores for the patient for each of the time intervals. In some implementations, a length of one or more of the time intervals is automatically adjusted based on a determined growth rate of the diseased cells. In some implementations, the type of disease includes at least one of a cancer, a bacteria, or a virus. In some implementations, the diseased cells are constituents of brain tissue, and wherein the extracted features of the feature vector include one or more of a cortical mean thickness value of the brain tissue, an inner-cortical surface area of the brain tissue, a mid-cortical surface area of the brain tissue, a pial-cortical surface area of the brain tissue, grey matter (GM) volume of the brain tissue, cerebrospinal fluid (CSF) volume of the brain tissue, white matter (WM) volume of the brain tissue, and a total volume for GM, CSF, and WM for each region of interest in the brain tissue.

In some implementations, the extracted features of the feature vector include one or more of a size of a diseased cell or group of diseased cells, a shape of a diseased cell or group of diseased cells, a size of a nucleus of a diseased cell, a shape of a nucleus of a diseased cell, a cell density of the diseased cells in tissue represented in the image data, and a pattern of cell migration of one or more of the diseased cells relative to neighboring cells. In some implementations, the machine learning model comprises a convolutional neural network (CNN), wherein one or more synapse weights are set based on the labeled image data. In some implementations, the predicted rate of disease progression represents a rate of proliferation of diseased cells.

Figure 9:
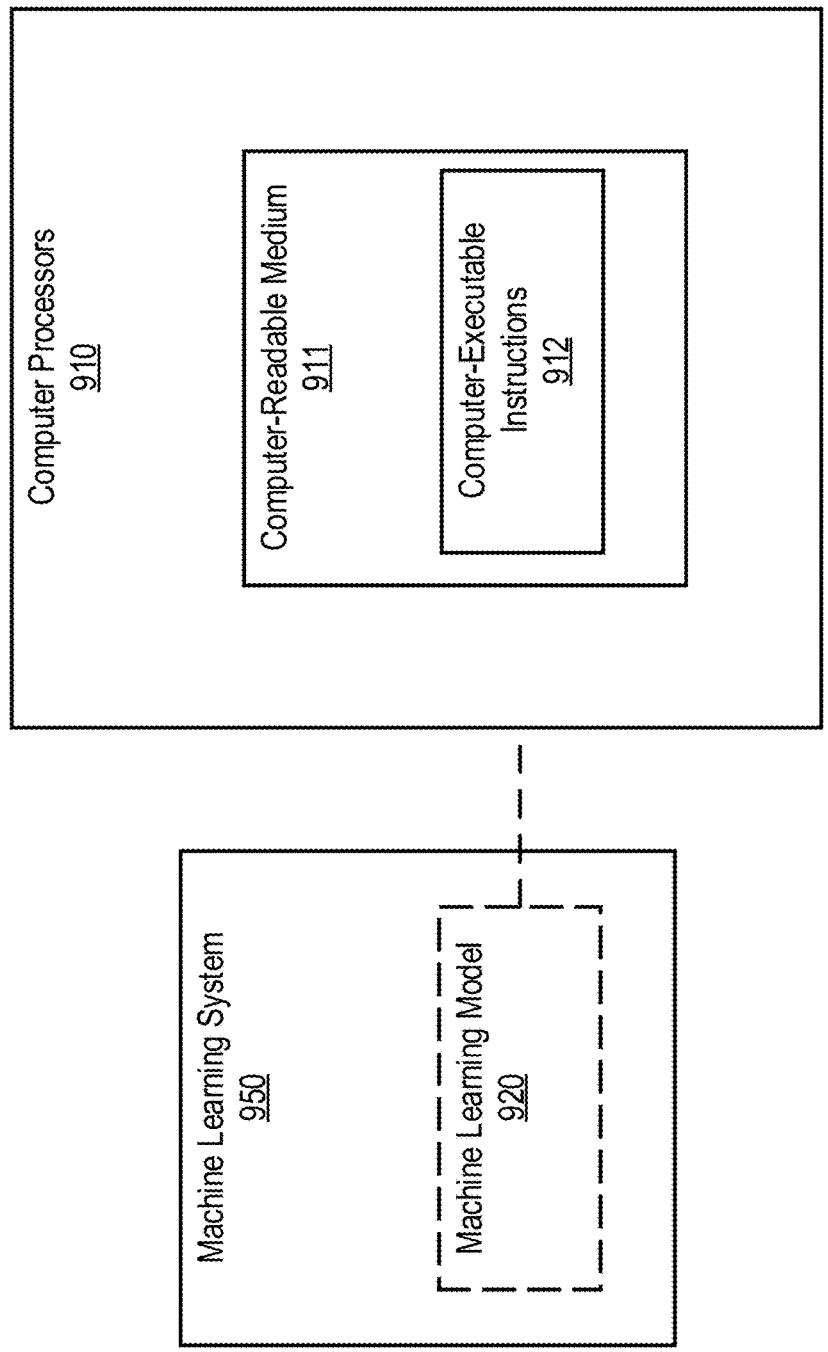
FIG. 9 is a diagram illustrating an example computer system configured to execute a machine learning model.

FIG. 9 is a diagram illustrating an example computer system 900 (e.g., data processing device 120 of FIG. 1) configured to execute a machine learning model. Generally, the computer system 900 is configured to process image data or feature data, as previously described, and determine a classification of the image data to one or more images in an image library (e.g., data store 160). The computer system 900 is configured to predict a rate of disease progression for a patient based on the image data classification. In an aspect, the system 900 includes computer processors 910. The computer processors 910 include computer-readable memory 911 and computer readable instructions 912. The system 900 also includes a machine learning system 950. The machine learning system 950 includes a machine learning model 920 (e.g., machine learning model 170 of FIG. 1). The machine learning model 920 can be separate from or integrated with the computer processors 910.

The computer-readable medium 911 (or computer-readable memory) can include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. In an embodiment, the computer-readable medium 911 includes code-segment having executable instructions.

In some implementations, the computer processors 910 include a general purpose processor. In some implementations, the computer processors 910 include a central processing unit (CPU). In some implementations, the computer processors 910 include at least one application specific integrated circuit (ASIC). The computer processors 910 can also include general purpose programmable microprocessors, graphic processing units, special-purpose programmable microprocessors, digital signal processors (DSPs), programmable logic arrays (PLAs), field programmable gate arrays (FPGA), special purpose electronic circuits, etc., or a combination thereof. The computer processors 910 are configured to execute program code means such as the computer-executable instructions 912 and configured to execute executable logic that includes the machine learning model 920.

The computer processors 910 are configured to receive data indicating features of diseased tissue, either as feature vector data, as image data, or in some combination of feature vector data and image data. These data are referred to as input data to the machine learning model 920. The input data are obtained through one or more means, such as wireless communications with databases, optical fiber communications, USB, CD-ROM, and so forth (e.g., over network 130 of FIG. 1).

The machine learning model 920 is capable of processing the data to determine the scored image data stored in the data warehouse (e.g., warehouse 300) that most closely matches the image data received as input data or that is associated with features included in the feature vector. In some implementations, the machine learning model 920 is trained to determine the score that should be associated with the input data based on a data set included scored (e.g., labeled) images of diseased tissue that include the disease of the same type as represented in the input data. The machine learning model 920 can determine the predicted rate of disease progression. Accordingly, when a data set (in vitro or in silico) is introduced to the machine learning model 920, it can predict the associated rate of disease progression for that tissue and disease type.

The machine learning system 950 is capable of applying machine learning techniques to train the machine learning model 920. As part of the training of the machine learning model 920, the machine learning system 950 forms a training set of input data by identifying a positive training set of input data items that have been determined to include various stages of diseased tissue, and, in some embodiments, forms a negative training set of input data items that lack diseased tissue, that represent healthy tissue, or that represent a non-progressing disease.

The machine learning system 950 receives feature values from the input data, or, where applicable, extracts the feature values from the input data of the training set, the features being variables deemed potentially relevant to whether or not the input data items have the associated property or properties. The feature vector, as previously described, includes an ordered list of the features for the input data. In one embodiment, the machine learning system 950 applies dimensionality reduction (e.g., via linear discriminant analysis (LDA), principle component analysis (PCA), or the like) to reduce the amount of data in the feature vectors for the input data to a smaller, more representative set of data.

In some implementations, the machine learning system 950 uses supervised machine learning to train the machine learning models 920 with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The machine learning model 920, when applied to the feature vector extracted from the input data item, outputs an indication of a scalar value representing a probability or score value associated with a rate of disease progression.

In some embodiments, a validation set is formed of additional input data, other than those in the training sets, which have already been determined to represent varying rates of disease progression in a patient for different disease types. The machine learning system 950 applies the trained machine learning model 920 to the data of the validation set to quantify the accuracy of the machine learning model 920. Common metrics applied in accuracy measurement include: Precision=TP/(TP+FP) and Recall=TP/(TP+FN), where precision is how many the machine learning model correctly predicted (TP or true positives) out of the total it predicted (TP+FP or false positives), and recall is how many the machine learning model correctly predicted (TP) out of the total number of input data items that did have diseased tissue (TP+FN or false negatives). The F score (F-score=2*PR/(P+R)) unifies precision and recall into a single measure. In one embodiment, the machine learning module iteratively re-trains the machine learning model until the occurrence of a stopping condition, such as the accuracy measurement indication that the model is sufficiently accurate, or a number of training rounds having taken place.

In some implementations, the machine learning model 920 is a convolutional neural network (CNN). A CNN can be configured based on a presumption that inputs to the CNN correspond to image pixel data for an image or other data that includes features at multiple spatial locations. For example, sets of inputs can form a multi-dimensional data structure, such as a tensor, that represent color features of an example digital image (e.g., a biological image of biological tissue). In some implementations, inputs to the CNN correspond to a variety of other types of data, such as data obtained from different devices and sensors of a vehicle, point cloud data, audio data that includes certain features or raw audio at each of multiple time steps, or various types of one-dimensional or multiple dimensional data. A convolutional layer of the CNN can process the inputs to transform features of the image that are represented by inputs of the data structure. For example, the inputs are processed by performing dot product operations using input data along a given dimension of the data structure and a set of parameters for the convolutional layer.

Performing computations for a convolutional layer can include applying one or more sets of kernels to portions of inputs in the data structure. The manner in which CNN performs the computations can be based on specific properties for each layer of an example multi-layer neural network or deep neural network that supports deep neural net workloads. A deep neural network can include one or more convolutional towers (or layers) along with other computational layers. In particular, for example computer vision applications, these convolutional towers often account for a large proportion of the inference calculations that are performed. Convolutional layers of a CNN can have sets of artificial neurons that are arranged in three dimensions, a width dimension, a height dimension, and a depth dimension. The depth dimension corresponds to a third dimension of an input or activation volume and can represent respective color channels of an image of the image data. For example, input images can form an input volume of data (e.g., activations), and the volume has dimensions 32×32×3 (width, height, depth respectively). A depth dimension of 3 can correspond to the RGB color channels of red (R), green (G), and blue (B).

In general, layers of a CNN are configured to transform the three dimensional input volume (inputs) to a multi-dimensional output volume of neuron activations (activations). For example, a 3D input structure of 32×32×3 holds the raw pixel values of an example image, in this case an image of width 32, height 32, and with three color channels, R, G, and B. A convolutional layer of a CNN of the machine learning model 920 computes the output of neurons that may be connected to local regions in the input volume. Each neuron in the convolutional layer can be connected only to a local region in the input volume spatially, but to the full depth (e.g., all color channels) of the input volume. For a set of neurons at the convolutional layer, the layer computes a dot product between the parameters (weights) for the neurons and a certain region in the input volume to which the neurons are connected. This computation may result in a volume such as 32×32×12, where 12 corresponds to a number of kernels that are used for the computation. A neuron's connection to inputs of a region can have a spatial extent along the depth axis that is equal to the depth of the input volume. The spatial extent corresponds to spatial dimensions (e.g., x and y dimensions) of a kernel.

A set of kernels can have spatial characteristics that include a width and a height and that extends through a depth of the input volume. Each set of kernels for the layer is applied to one or more sets of inputs provided to the layer. That is, for each kernel or set of kernels, the machine learning model 920 can overlay the kernel, which can be represented multi-dimensionally, over a first portion of layer inputs (e.g., that form an input volume or input tensor), which can be represented multi-dimensionally. For example, a set of kernels for a first layer of a CNN may have size 5×5×3×16, corresponding to a width of 5 pixels, a height of 5 pixel, a depth of 3 that corresponds to the color channels of the input volume to which to a kernel is being applied, and an output dimension of 16 that corresponds to a number of output channels. In this context, the set of kernels includes 16 kernels so that an output of the convolution has a depth dimension of 16.

The machine learning model 920 can then compute a dot product from the overlapped elements. For example, the machine learning model 920 can convolve (or slide) each kernel across the width and height of the input volume and compute dot products between the entries of the kernel and inputs for a position or region of the image. Each output value in a convolution output is the result of a dot product between a kernel and some set of inputs from an example input tensor. The dot product can result in a convolution output that corresponds to a single layer input, e.g., an activation element that has an upper-left position in the overlapped multi-dimensional space. As discussed above, a neuron of a convolutional layer can be connected to a region of the input volume that includes multiple inputs. The machine learning model 920 can convolve each kernel over each input of an input volume. The machine learning model 920 can perform this convolution operation by, for example, moving (or sliding) each kernel over each input in the region.

The machine learning model 920 can move each kernel over inputs of the region based on a stride value for a given convolutional layer. For example, when the stride is set to 1, then the machine learning model 920 can move the kernels over the region one pixel (or input) at a time. Likewise, when the stride is 2, then the machine learning model 920 can move the kernels over the region two pixels at a time. Thus, kernels may be shifted based on a stride value for a layer and the machine learning model 920 can repeatedly perform this process until inputs for the region have a corresponding dot product. Related to the stride value is a skip value. The skip value can identify one or more sets of inputs (2×2), in a region of the input volume, that are skipped when inputs are loaded for processing at a neural network layer. In some implementations, an input volume of pixels for an image can be "padded" with zeros, e.g., around a border region of an image. This zero-padding is used to control the spatial size of the output volumes.

As discussed previously, a convolutional layer of CNN is configured to transform a three dimensional input volume (inputs of the region) to a multi-dimensional output volume of neuron activations. For example, as the kernel is convolved over the width and height of the input volume, the machine learning model 920 can produce a multi-dimensional activation map that includes results of convolving the kernel at one or more spatial positions based on the stride value. In some cases, increasing the stride value produces smaller output volumes of activations spatially. In some implementations, an activation can be applied to outputs of the convolution before the outputs are sent to a subsequent layer of the CNN.

An example convolutional layer can have one or more control parameters for the layer that represent properties of the layer. For example, the control parameters can include a number of kernels, K, the spatial extent of the kernels, F, the stride (or skip), S, and the amount of zero padding, P. Numerical values for these parameters, the inputs to the layer, and the parameter values of the kernel for the layer shape the computations that occur at the layer and the size of the output volume for the layer. In some implementations, the spatial size of the output volume is computed as a function of the input volume size, W, using the formula (W−F+2P)/S+1. For example, an input tensor can represent a pixel input volume of size [227×227×3]. A convolutional layer of a CNN can have a spatial extent value of F=11, a stride value of S=4, and no zero-padding (P=0). Using the above formula and a layer kernel quantity of K=156, the machine learning model 920 performs computations for the layer that results in a convolutional layer output volume of size [55×55×156], where 55 is obtained from [(227−11+0)/4+1=55].

The computations (e.g., dot product computations) for a convolutional layer, or other layers, of a CNN involve performing mathematical operations, e.g., multiplication and addition, using a computation unit of a hardware circuit of the machine learning model 920. The design of a hardware circuit can cause a system to be limited in its ability to fully utilize computing cells of the circuit when performing computations for layers of a neural network.

Figure 10:
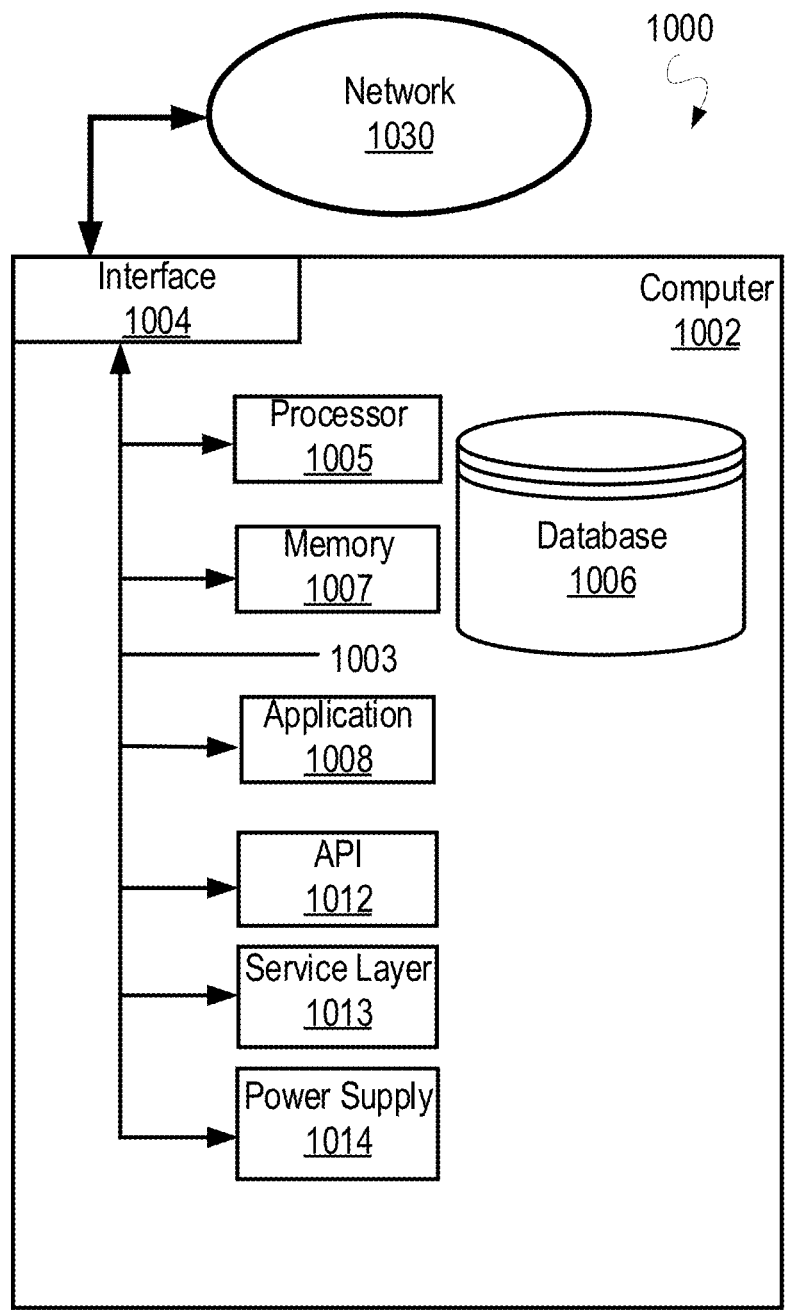
FIG. 10 is a block diagram of an example computer system used to provide computational functionalities associated with described algorithms, methods, functions, processes, flows, and procedures described in the present disclosure.

FIG. 10 is a block diagram of an example computer system 1000 used to provide computational functionalities associated with described algorithms, methods, functions, processes, flows, and procedures described in the present disclosure (such as the method 200 described previously with reference to FIGS. 2A-2B and/or process 400 described in relation to FIGS. 4A-4C), according to some implementations of the present disclosure. The illustrated computer 1002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI or GUI).

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a high level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus 1003. In some implementations, any or all of the components of the computer 1002, including hardware or software components, can interface with each other or the interface 1004 (or a combination of both), over the system bus 1003. Interfaces can use an application programming interface (API) 1012, a service layer 1013, or a combination of the API 1012 and service layer 1013. The API 1012 can include specifications for routines, data structures, and object classes. The API 1012 can be either computer-language independent or dependent. The API 1012 can refer to a complete interface, a single function, or a set of APIs.

The service layer 1013 can provide software services to the computer 1002 and other components (whether illustrated or not) that are communicably coupled to the computer 1002. The functionality of the computer 1002 can be accessible for all service consumers using this service layer. Software services, such as those provided by the service layer 1013, can provide reusable, defined functionalities through a defined interface. For example, the interface can be software written in JAVA, C++, or a language providing data in extensible markup language (XML) format. While illustrated as an integrated component of the computer 1002, in alternative implementations, the API 1012 or the service layer 1013 can be stand-alone components in relation to other components of the computer 1002 and other components communicably coupled to the computer 1002. Moreover, any or all parts of the API 1012 or the service layer 1013 can be implemented as child or sub-modules of another software module, enterprise application, or hardware module without departing from the scope of the present disclosure.

The computer 1002 includes an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030 or the interface's hardware can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 also includes a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases) according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer 1002.

The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

The application 1008 can be an algorithmic software engine providing functionality according to particular needs, desires, or particular implementations of the computer 1002 and the described functionality. For example, application 1008 can serve as one or more components, modules, or applications. Further, although illustrated as a single application 1008, the application 1008 can be implemented as multiple applications 1008 on the computer 1002. In addition, although illustrated as internal to the computer 1002, in alternative implementations, the application 1008 can be external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the power-supply 1014 can include a power plug to allow the computer 1002 to be plugged into a wall socket or a power source to, for example, power the computer 1002 or recharge a rechargeable battery.

There can be any number of computers 1002 associated with, or external to, a computer system containing computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

In the previous description, for the purposes of explanation, numerous specific details are set forth in order to provide a thorough understanding of the present disclosure. However, the present disclosure may be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising" or "further including" in the foregoing description or following claims, what follows this phrase can be an additional step or entity, or a sub-step/sub-entity of a previously-recited step or entity.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure.

What is claimed is:

1. A method for treatment of a disease by monitoring a progression of the disease, the method comprising: obtaining image data including a representation of at least one disease cell of a patient, the at least one disease cell having a type of disease, the obtaining comprising: imaging, by an imaging device, the at least one disease cell at multiple instances over a time period to generate image data; for each instance of the multiple instances, extracting values from the image data for one or more features for the at least one disease cell, the one or more features each representing a physical parameter of at least one of at least one disease cell represented in the image data; inputting the values for the one or more features into a machine learning model, the machine learning model being trained with labeled image data that is associated with a same patient demographic as a patient demographic associated with the at least one disease cell; processing the values for the one or more features using the machine learning model, the machine learning model being trained with labeled image data representing instances of diseased cells having the type of disease and a given shape, the labeled image data associating scores representing predicted rates of disease progression with the respective instances of diseased cells having the type of disease and different shapes; determining, non-invasively and based on the processing, a score representing a predicted rate of disease progression indicated by the image data, the predicted rate of disease progression representing a comparison between a rate of progression of the disease in the at least one disease cell with a baseline progression from the labeled image data, the comparison being for a unique molecular profile and a unique cellular profile of the patient; and based on the score, generating a treatment regimen for how to perform a treatment including one or more of radiation therapy, chemotherapy, or tumor treatment fields (TTT) based on the predicted rate of disease progression; and performing the treatment based on the generated treatment regimen for how to perform a treatment.

2. The method of claim 1, wherein cells of the image data are tagged with a protein tag, and wherein extracting the one or more features from the image data comprises identifying cells having the protein tag in the image data.

3. The method of claim 2, wherein the protein tag is configured to fluorescently label cells in an NF-κB signal pathway, and wherein the type of disease comprises a glioblastoma multiforme (GBM) tumor, and wherein the method further comprises:
    including, with the one or more features values, based on the NF-κB signal pathway that is labeled, a feature value representing the NF-κB signal pathway;
    processing, using the machine learning model, the feature value; and
    determining, based on the processing, the score representing the predicted rate of disease progression, wherein the disease progression represents a growth rate of the GBM tumor.

4. The method of claim 1, wherein the image data include a series of images including the disease cells of the patient and captured at time intervals, and wherein each image of the series of images is associated with a respective score to form a sequence of scores for the patient for each of the time intervals.

5. The method of claim 4, wherein a length of one or more of the time intervals is automatically adjusted based on a determined growth rate of the diseased cells.

6. The method of claim 1, wherein the type of disease includes at least one of a cancer, a bacteria, or a virus.

7. The method of claim 1, wherein the disease cells are constituents of brain tissue, and wherein the one or more features include one or more of a cortical mean thickness value of the brain tissue, an inner-cortical surface area of the brain tissue, a mid-cortical surface area of the brain tissue, a pial-cortical surface area of the brain tissue, grey matter (GM) volume of the brain tissue, cerebrospinal fluid (CSF) volume of the brain tissue, white matter (WM) volume of the brain tissue, and a total volume for GM, CSF, and WM for each region of interest in the brain tissue.

8. The method of claim 1, wherein the one or more features of include one or more of a size of a disease cell or group of disease cells, a shape of a disease cell or group of disease cells, a size of a nucleus of a disease cell, a shape of a nucleus of a disease cell, a cell density of the disease cells in tissue represented in the image data, and a pattern of cell migration of one or more of the disease cells relative to neighboring cells.

9. The method of claim 1, wherein the machine learning model comprises a convolutional neural network (CNN), wherein one or more synapse weights are set based on the labeled image data.

10. The method of claim 1, wherein the predicted rate of disease progression represents a rate of proliferation of diseased cells.

11. A system for treatment of a disease by monitoring a progression of the disease, the system comprising: an imaging device configured to image at least one disease cell at multiple instances over a time period to generate image data; at least one processing device; and a memory in communication with the at least one processing device, the memory storing instructions that, when executed by the at least one processing device, cause the at least one processing device to perform operations comprising: obtaining the image data including a representation of at least one disease cell of a patient, the at least one disease cell having a type of disease; for each instance of the multiple instances, extracting values from the images data for one or more features for the at least one disease cell, the one or more features each representing a physical parameter of at least one of at least one disease cell represented in the image data; inputting the values for the one or more features into a machine learning model, the machine learning model being trained with labeled image data that is associated with a same patient demographic as a patient demographic associated with the at least one disease cell; processing the values for the one or more features using the machine learning model, the machine learning model being trained with labeled image data representing instances of diseased cells having the type of disease and a given shape, the labeled image data associating scores representing predicted rates of disease progression with the respective instances of diseased cells having the type of disease and different shapes; determining, non-invasively and based on the processing, a score representing a predicted rate of disease progression indicated by the image data, the predicted rate of disease progression representing a comparison between a rate of progression of the disease in the at least one disease cell with a baseline progression from the labeled image data, the comparison being for a unique molecular profile and a unique cellular profile of the patient; and based on the score, generating a treatment regimen for how to perform a treatment including one or more of radiation therapy, chemotherapy, or tumor treatment fields (TTT) based on the predicted rate of disease progression; and causing performance of the treatment based on the generated treatment regimen for how to perform a treatment.

12. The system of claim 11, wherein cells of the image data are tagged with a protein tag, and wherein extracting the one or more features from the image data comprises identifying cells having the protein tag in the image data.

13. The system of claim 12, wherein the protein tag is configured to fluorescently label cells in an NF-κB signal pathway, and wherein the type of disease comprises a glioblastoma multiforme (GBM) tumor, and wherein the operations further comprise:

including, with the one or more features values, based on the NF-κB signal pathway that is labeled, a feature value representing the NF-κB signal pathway;

processing, using the machine learning model, the feature value; and determining, based on the processing, the score representing the predicted rate of disease progression, wherein the disease progression represents a growth rate of the GBM tumor.

14. The system of claim 11, wherein the image data include a series of images including the disease cells of the patient and captured at time intervals, and wherein each image of the series of images is associated with a respective score to form a sequence of scores for the patient for each of the time intervals.

15. The system of claim 14, wherein a length of one or more of the time intervals is automatically adjusted based on a determined growth rate of the diseased cells.

16. The system of claim 11, wherein the type of disease includes at least one of a cancer, a bacteria, or a virus.

17. The system of claim 11, wherein the disease cells are constituents of brain tissue, and wherein the one or more features include one or more of a cortical mean thickness value of the brain tissue, an inner-cortical surface area of the brain tissue, a mid-cortical surface area of the brain tissue, a pial-cortical surface area of the brain tissue, grey matter (GM) volume of the brain tissue, cerebrospinal fluid (CSF) volume of the brain tissue, white matter (WM) volume of the brain tissue, and a total volume for GM, CSF, and WM for each region of interest in the brain tissue.

18. The system of claim 11, wherein the one or more features of include one or more of a size of a disease cell or group of disease cells, a shape of a disease cell or group of disease cells, a size of a nucleus of a disease cell, a shape of a nucleus of a disease cell, a cell density of the disease cells in tissue represented in the image data, and a pattern of cell migration of one or more of the disease cells relative to neighboring cells.

19. One or more non-transitory computer readable media storing executable instructions that, when executed by at least one processing device, cause the at least one processing device to perform operations for treatment of a disease by monitoring a progression of the disease, the operations comprising: obtaining image data including a representation of at least one disease cell of a patient, the at least one disease cell having a type of disease, the obtaining comprising: imaging, by an imaging device, the at least one disease cell at multiple instances over a time period to generate image data; for each instance of the multiple instances, extracting values from the images data for one or more features for the at least one disease cell, the one or more features each representing a physical parameter of at least one of at least one disease cell represented in the image data; inputting the values for the one or more features into a machine learning model, the machine learning model being trained with labeled image data that is associated with a same patient demographic as a patient demographic associated with the at least one disease cell; processing the values for the one or more features using the machine learning model, the machine learning model being trained with labeled image data representing instances of diseased cells having the type of disease and a given shape, the labeled image data associating scores representing predicted rates of disease progression with the respective instances of diseased cells having the type of disease and different shapes; determining, non-invasively and based on the processing, a score representing a predicted rate of disease progression indicated by the image data, the predicted rate of disease progression representing a comparison between a rate of progression of the disease in the at least one disease cell with a baseline progression from the labeled image data, the comparison being for a unique molecular profile and a unique cellular profile of the patient; and based on the score, generating a treatment regimen for how to perform a treatment including one or more of radiation therapy, chemotherapy, or tumor treatment fields (TTT) based on the predicted rate of disease progression unique molecular profile and the unique cellular profile of the patient; and causing performance of the treatment based on the generated treatment regimen for how to perform a treatment.

20. The method of claim 1, further comprising:
tagging the at least one disease cell with a cell tag in a cell cultivation environment;
obtaining the image data of the at least one disease cell at the multiple instances over the time period;
for each instance of the multiple instances, extracting the values for the one or more features for the at least one disease cell, the one or more features comprising a size of the at least one disease cell, a surface smoothness factor for the at least one disease cell, and a cell count associated with the at least one disease cell;
inputting the values for the one or more features into the machine learning model; and
generating, based on the inputting, the score representing the predicted rate of disease progression.

21. The method of claim 1, further comprising:
training the machine learning model with the labeled image data representing instances of diseased cells having the type of disease, the labeled image data associating the scores representing the predicted rates of disease progression with the respective instances of diseased cells having the type of disease.

* * * * *